(12) United States Patent
Shibata et al.

(10) Patent No.: US 7,421,201 B2
(45) Date of Patent: Sep. 2, 2008

(54) ROUTE DETERMINATION METHOD USED IN OPTICAL SIGNAL TRANSMISSION SYSTEM

(75) Inventors: Megumi Shibata, Kameoka (JP); Hiroyuki Iwaki, Kawasaki (JP); Hisanori Okano, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/239,391

(22) Filed: Sep. 30, 2005

(65) Prior Publication Data
US 2006/0018665 A1   Jan. 26, 2006

Related U.S. Application Data

(63) Continuation of application No. PCT/JP2003/007801, filed on Jun. 19, 2003.

(51) Int. Cl.
*H04J 14/00* (2006.01)
(52) U.S. Cl. .......................................... 398/48; 398/57
(58) Field of Classification Search ............. 398/48–50, 398/57
See application file for complete search history.

(56) References Cited

U.S. PATENT DOCUMENTS 7,050,718 B2 * 5/2006 Rychlicki .................... 398/57

| | | | |
|---|---|---|---|
| 2002/0005967 A1 | 1/2002 | Suzuki | |
| 2002/0005968 A1 | 1/2002 | Suzuki | |
| 2003/0011844 A1 * | 1/2003 | Park et al. ................ | 359/128 |
| 2004/0208577 A1 * | 10/2004 | Cahill ...................... | 398/83 |

FOREIGN PATENT DOCUMENTS

| JP | 5-235864 | 9/1993 |
| JP | 6-260710 | 9/1994 |
| JP | 2002-26822 | 1/2002 |
| JP | 2002-27514 | 1/2002 |
| JP | 2002-198981 | 7/2002 |
| JP | 2003-169027 | 6/2003 |

* cited by examiner

*Primary Examiner*—Jason Chan
*Assistant Examiner*—Nathan M Curs
(74) *Attorney, Agent, or Firm*—Staas & Halsey LLP

(57) ABSTRACT

A method of determining a transmission route for optical signals in an optical signal transmission system comprising a transmitter for optical signals, a receiver for the optical signals, and repeaters for repeating the optical signals transmitted from the transmitter to the receiver, and having transmission routes between the transmitter and the receiver, wherein the numbers of the wavelength components of the optical signals that has been in-use in each section defined to each of the transmission routes, the acquired numbers of wavelength components are compared among the transmission routes, and one of the transmission routes having the minimum number of wavelength components is determined as the transmission route used to set the line.

4 Claims, 23 Drawing Sheets

ROUTE DETERMINATION METHOD USED IN OPTICAL SIGNAL TRANSMISSION SYSTEM

CROSS-REFERENCE TO RELATED APPLICATION

This is a continuation of Application PCT/JP2003/007801, filed on Jun. 19, 2003, now pending, the contents of which are herein wholly incorporated by reference.

BACKGROUND OF THE INVENTION

1. Field of the Invention

The present invention relates to a technique for performing a route setting in an optical wavelength division multiplexing (WDM) transmission.

2. Description of the Related Art

FIG. 22 is a diagram showing a configuration of an optical wavelength division multiplexing transmission system, which has a WDM transmission network, an optical transmitter, an optical receiver, and a network controller. The optical transmitter sorts transmission signals inputted from a transmitting terminal into respective wavelength components. The sorted transmission signals (electrical signals) are converted into respective optical signals, wavelength-multiplexed, and sent to the WDM transmission network. The optical receiver receives the optical signals transmitted through the WDM transmission network, converts the optical signals into the electrical signals, and transmits the electrical signals to a receiving terminal. The network controller has a management function for the WDM transmission network, the optical transmitter, the optical receiver, and the like. The WDM transmission network has a plurality of NEs (Network Elements) which are connected in a mesh manner and repeat the transmission signals.

In the wavelength division multiplexing transmission system as shown in FIG. 22, when a new line is added, a transmission property of the transmission signals of each route in the WDM transmission network is evaluated, and the optimal route for each wavelength component of the transmission signals in the WDM transmission network is retrieved and set.

As the prior art related to this invention, for example, there is a wavelength division multiplexing transmission system as disclosed in Patent Document 1.

[Patent Document 1] JP-A 2002-26822

Patent Document 1 proposes a method of retrieving the optimal route for each wavelength component and setting the route. However, in a case where the route can be selected only for each wavelength component, there is a possibility that it is caused a problem that a route must be determined so as to bypass the optimal route such as shortest route.

Also, in a case of avoiding the foregoing problem, it is necessary to switch a wavelength currently used to a different wavelength. Thus, there is a possibility that influence is given to lines under operation.

Also, a portion between a start point and an end point of the optimal route in the WDM transmission network does not always have the same wavelength. In the optimal route, the wavelength is also considered to be different between the NEs.

Moreover, since the new line is added to the optimal route, the influence (OSNR (Optical Signal to Noise Ratio) degradation, deterioration in gain tilt, and the like) is inevitably given to the other lines, but the measure against it is not considered.

SUMMARY OF THE INVENTION

One of the objects of the present invention is to provide a technique capable of setting a line in a proper transmission route.

Also, one of the objects of the present invention is to provide a technique capable of flexibly setting a line.

Also, one of the objects of the present invention is to provide a technique capable of determining a transmission route having a good transmission property of optical signals, among a plurality of transmission routes.

Also, one of the objects of the present invention is to provide a technique capable of, after an addition of a new line to a certain transmission route, increasing in quality of optical signals transmitted through the certain transmission route.

According to a first aspect of the present invention, there is provided an optical-signal transmission route determination method used in an optical signal transmission system that includes a transmitter for optical signals, a receiver for the optical signals, and one or more repeaters for repeating the optical signals transmitted from the transmitter to the receiver, and has transmission routes for the optical signals between the transmitter and the receiver, the method serving to determine one of the transmission routes used to set a line for the optical signal between the transmitter and the receiver and including:

obtaining, for each transmission route, the number of wavelength components of the optical signal that has been in-use in each section defined to each of the transmission routes;

comparing the obtained numbers of the wavelength components between the transmission routes; and determining the transmission route, in which the number of the wavelength components is the smallest in the comparison, as the one of the transmission routes.

According to the first aspect, a transmission route having the smallest number of the wavelength components being used can be determined as the transmission route to be applied to the line, among the plurality of the transmission routes.

According to a second aspect of the present invention, there is provided an optical-signal transmission route determination method used in an optical signal transmission system that includes a transmitter for optical signals, a receiver for the optical signals, and one or more repeaters for repeating the optical signals transmitted from the transmitter to the receiver, and has transmission routes for the optical signals between the transmitter and the receiver, the method serving to determine one of the transmission routes used to set a line for the optical signal between the transmitter and the receiver and including:

obtaining, for each transmission route, the number of repeaters located on each of the transmission routes;

comparing the numbers of the repeaters between the transmission routes; and determining the transmission route, in which the number of the repeaters is the smallest in the comparison, as the one of transmission routes.

According to the second aspect, a transmission route having the smallest number of the repeaters can be determined as the transmission route to be applied to the line, among the plurality of the transmission routes.

According to a third aspect of the present invention, there is provided an optical-signal transmission route determination method used in an optical signal transmission system that includes a transmitter for optical signals; a receiver for the optical signals; and one or more repeaters for repeating the optical signals transmitted from the transmitter to the receiver, and has transmission routes for the optical signals between the transmitter and the receiver, the method serving to determine one of the transmission routes used to set a line for the optical signal between the transmitter and the receiver and including:

obtaining distances of each of the transmission routes;

comparing the transmission distances between the transmission routes; and determining the transmission route, in which the transmission distance is the shortest in the comparison, as the one of transmission routes.

According to the third aspect, a transmission route having the shortest transmission distance can be determined as the transmission route to be applied to the line, among the plurality of the transmission routes.

Preferably, according to any one of the first to third aspects, the optical-signal transmission route determination method further includes determining the wavelength of the optical signal to be applied to the line, for each section of the determined transmission route.

According to a fourth aspect of the present invention, there is provided a line setting method for an optical signal, used in an optical signal transmission system that includes a transmitter for optical signals, a receiver for the optical signals, and one or more repeaters for repeating the optical signal transmitted from the transmitter to the receiver, the method serving to set a line for the optical signal between the transmitter and the receiver and including:

determining a wavelength of the optical signal to be applied to each section of the line defined between the transmitter and the receiver; and outputting an instruction to set the line at the wavelength for each section.

Preferably, the line setting method for the optical signal further includes selecting, for each section, from one of at least one unused wavelength in the section, so that a transmission property of the selected wavelength or a multiple optical signal including the selected wavelength in the section becomes the best condition.

Further, preferably, the line setting method for the optical signal further includes:

determining the wavelength of the optical signal to be applied to each section for the line to be set on each of the transmission routes, if a plurality of transmission routes respectively passing through one or more repeaters exist between the transmitter and the receiver; and determining the transmission route, in which the transmission property of the optical signal arriving at the receiver through each transmission route at the determined wavelengths of each section becomes the best condition, as the transmission route to be applied to the line.

Further, preferably, the line setting method for the optical signal further includes:

when a new line is added to one of the transmission routes, storing the transmission property of a multiple optical signal arriving at the receiver through an existing line set on this transmission route;

obtaining the transmission property of the multiple optical signal arriving at the receiver through the new line and the existing line; and comparing the stored transmission property with the obtained transmission property, and if the transmission property is recognized as deteriorating due to the addition of the new line, outputting an instruction for improving the transmission property.

Further, preferably, the transmission property of the optical signal is any one of an optical signal-to-noise ratio, a light receiving power, and a gain tilt, or the combination of two or more of them.

Further, the present invention can be specified as an optical-signal transmission route determination system having the features similar to the first to third aspects.

Further, the present invention can be specified as an optical-signal line setting system having the features similar to the fourth aspect.

Further, the present invention can be specified as a method or system for determining a transmission route to be applied to a line for the optical signals, set between the transmission devices (for example, between the transmitter and the receiver) having a plurality of transmission routes for transmitting and receiving the optical signals, which has the features similar to the above-mentioned first and third aspects.

Further, the present invention can be specified as a method or system for setting a line for optical signals between the transmission devices that transmit and receive the optical signals, which has the features similar to the above-mentioned fourth aspect.

DESCRIPTION OF THE PREFERRED EMBODIMENTS

Embodiments of the present invention will be described below with reference to the drawings. A configuration of the embodiment is the exemplification, and the present invention is not limited to the configuration of the embodiment.

<Configuration of Optical Wavelength Division Multiplexing Transmission System>

First, an optical signal transmission system to which the present invention can be applied will be explained. The optical signal transmission system applied to the present invention includes an optical transmitter, an optical receiver, and a repeater, and can transmit a multiple optical signal (optical division multiplexing (WDM) signal), in which different wavelength components are multiplexed, from the optical transmitter through the repeater to the optical receiver.

Figure 1:
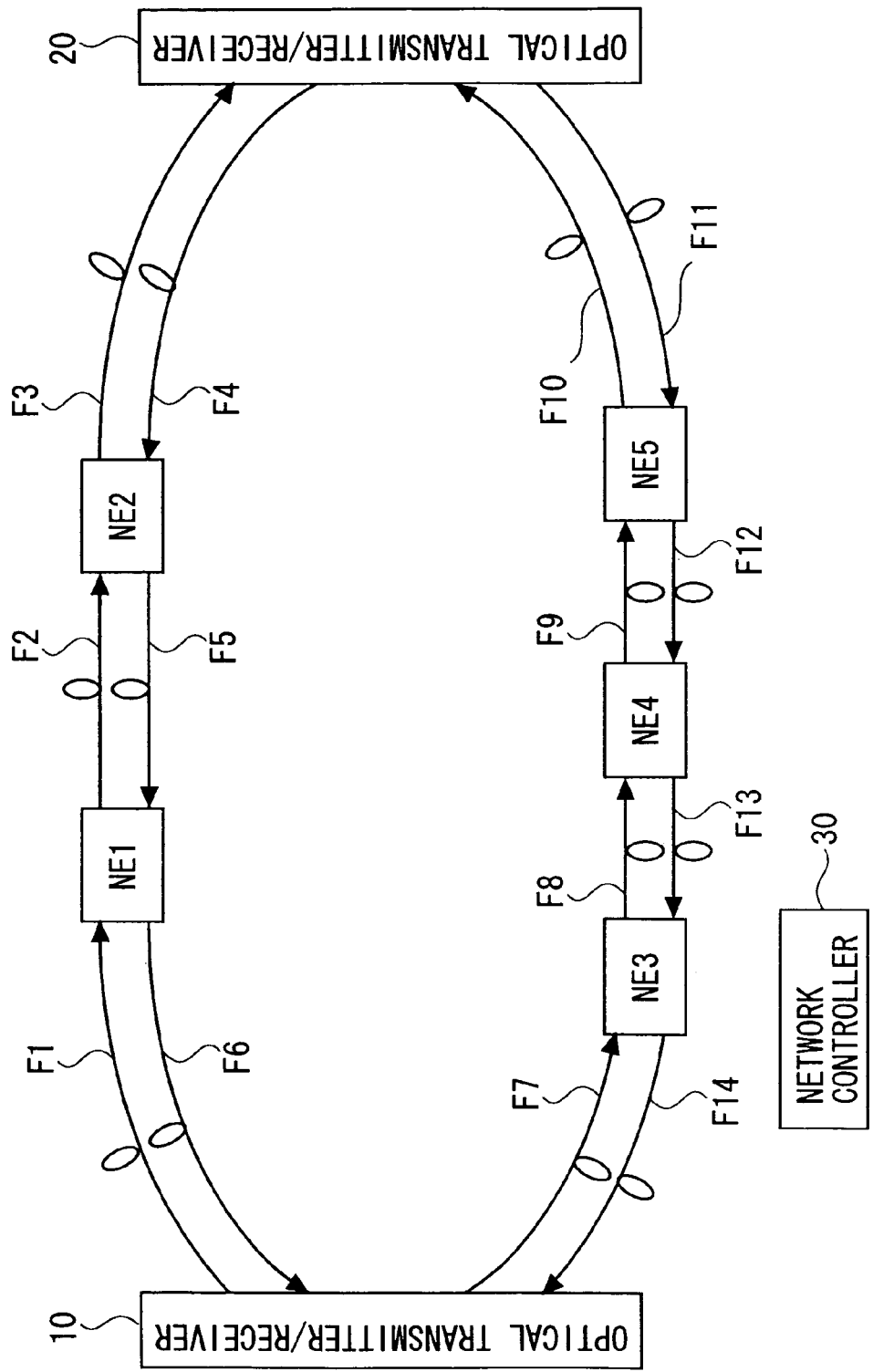
FIG. 1 is a diagram showing a configuration example of an optical multiplexing transmission system to which an embodiment of the present invention is applied.

FIG. 1 is a diagram showing an example of the optical wavelength division multiplexing transmission system. In FIG. 1, the optical wavelength division multiplexing transmission system includes an optical transmitter/receiver 10, an optical transmitter/receiver 20, network elements (NEs) serving as one or more repeaters located between the optical transmitter/receiver 10 and the optical transmitter/receiver 20 (exemplified as NEs 1 to 5 in FIG. 2A and FIG. 2B), and a network controller 30 for managing the optical transmitter/receivers 10 and 20 and the NEs 1 to 5. Those optical transmitter/receivers 10 and 20 and NEs 1 to 5 function as transmission devices of the optical signal.

In the example shown in FIG. 1, the NE 1 is connected through respective optical fibers F1 and F6 to the optical transmitter/receiver 10, the NE 2 is connected through respective optical fibers F2 and F5 to the NE 1, and the optical transmitter/receiver 20 is connected through respective optical fibers F3 and F4 to the NE 2.

On the other hand, the NE 3 is connected through respective optical fibers F7 and F14 to the optical transmitter/receiver 10, the NE4 is connected through respective optical fibers F8 and F13 to the NE 3, the NE5 is connected through respective optical fibers F9 and F12 to the NE4, and the optical transmitter/receiver 20 is connected through respective optical fibers F10 and F11 to the NE5.

Established in the foregoing configuration, as a transmitting route of the transmission signal of the optical type from the optical transmitter/receiver 10 to the optical transmitter/receiver 20, are the route (referred to as "first transmitting route") through which the signal is transmitted in the order of the optical fiber F1→the NE→the optical fiber F2→the NE2, and the route (referred to as "second transmitting route") through which the signal is transmitted in the order of the optical fiber F7→the NE3→the optical fiber F8→the NE4→the optical fiber F9→the NE5→the optical fiber F10.

On the other hand, established as a receiving route for the optical transmitter/receiver 10 receiving the optical signals from the optical transmitter/receiver 20 (the transmitting route of the transmission signal of the optical type to the optical transmitter/receiver 10 from the optical transmitter/receiver 20) are the route (referred to as "first receiving route") through which the signal is transmitted in the order of the optical fiber F4→the NE2→the optical fiber F5→the NE1→the optical fiber F6, and the route (referred to as "second receiving route") through which the signal is transmitted in the order of the optical fiber F11→the NE5→the optical fiber F12→the NE4→the optical fiber F13→the NE3→the optical fiber F14. Then, with the combination of the first and second transmitting routes and the first and second receiving routes, one or two rings can be formed between the optical transmitter/receivers 10 and 20.

The network controller 30 is configured to be able to communicate bidirectionally with the respective optical transmitter/receivers 10 and 20 and the respective NEs 1 to 5, and functions as a device for managing the statuses of those transmission devices and carrying out necessary controls.

Figure 2A:
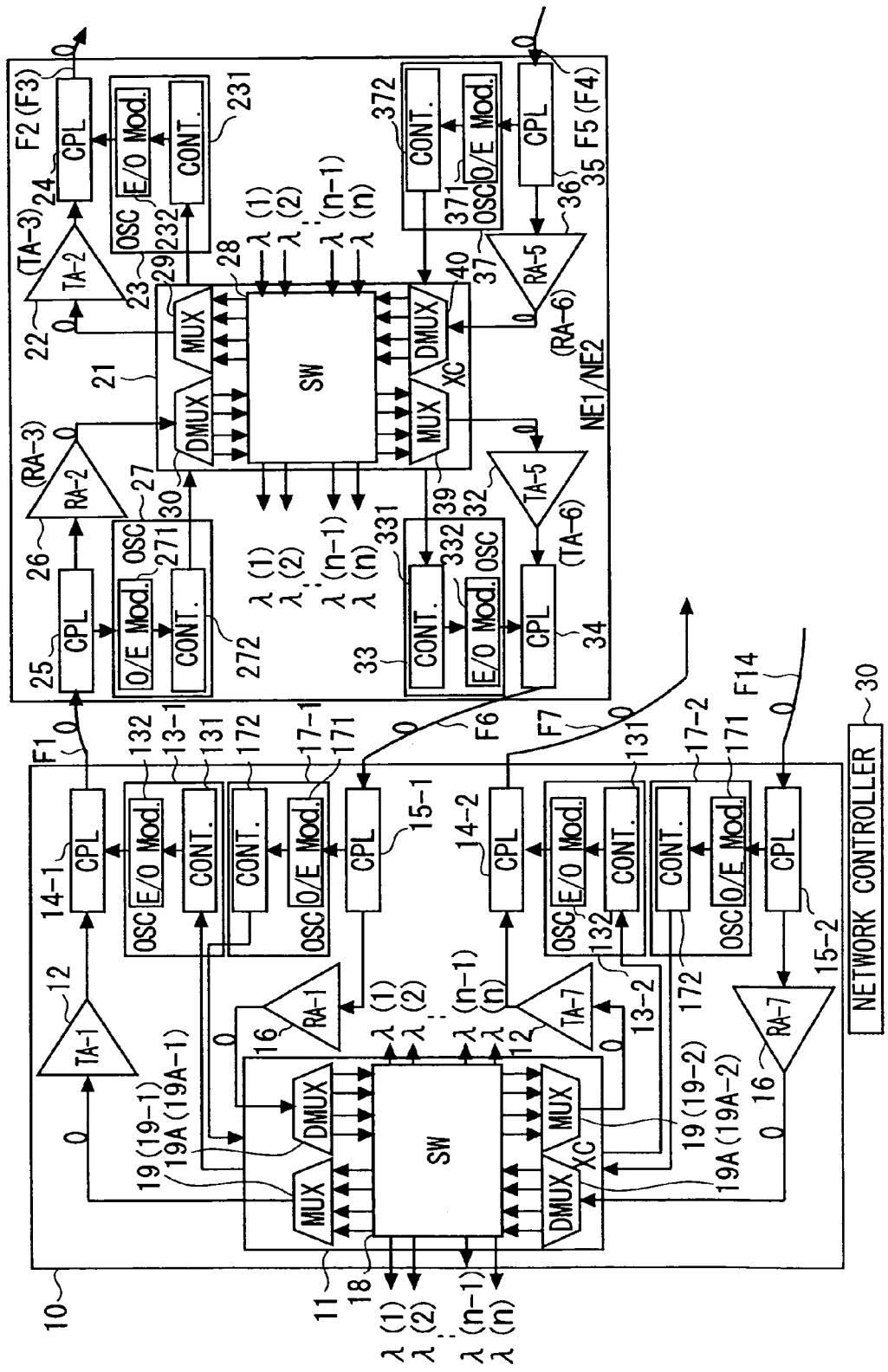
FIG. 2A and FIG. 2B are diagrams showing a configuration example related to transmission of optical signals in the optical multiplexing transmission system shown in FIG. 1.
Figure 2B:
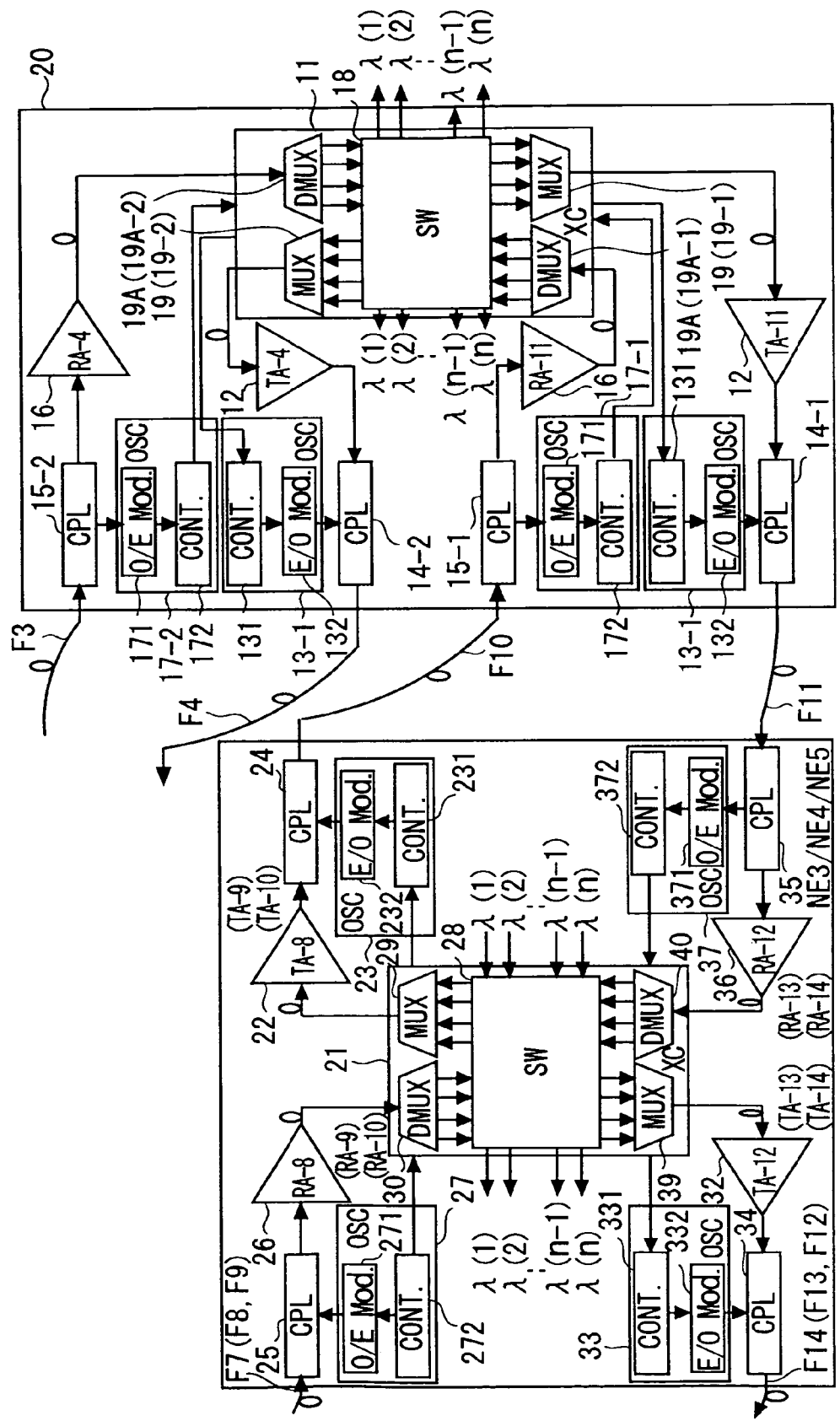

FIG. 2A and FIG. 2B are the diagrams showing the configuration examples of the respective optical transmitter/receivers and the respective NEs shown in FIG. 1. FIG. 2A shows the configurations of the optical transmitter/receiver 10 and NEs 1 and 2, and FIG. 2B shows the configurations of the optical transmitter/receiver 20 and respective NEs 3 to 5.

In FIG. 2A and FIG. 2B, the optical transmitter/receivers 10 and 20 have the similar configurations, respectively. When the optical transmitter/receiver 10 is explained as the example, the optical transmitter/receiver 10 combines the configuration as the optical transmitter and the configuration as the optical receiver.

The optical transmitter/receiver 10 includes two transmitting systems corresponding to the first and second transmitting routes as the configuration of the optical transmitter. To be specific, the optical transmitter/receiver 10 includes: a cross-connect (XC) unit (optical cross-connect (OXC) switch) 11; transmitting optical amplifiers (Transmitting Amplifier: TA) 12 (TA-1 and TA-2) prepared for each transmitting route, namely, optical fiber for transmitting (optical fibers F1, F7); transmitting OSC (Optical Supervisory Channel) units 13 (13-1 and 13-2); and optical fiber couplers (CPLs: optical multiplexers) 14 (14-1 and 14-2).

Also, the optical transmitter/receiver 10 includes the two receiving systems corresponding to the first and second receiving routes as the configuration of the optical receiver. To be specific, the optical transmitter/receiver 10 includes: the optical cross-connect switch 11; optical fiber couplers (CPLs: optical demultiplexers) 15 (15-1 and 15-2) prepared for each receiving route, namely, optical fiber for reception (optical fibers F6, F14) receiving optical amplifiers (Receiving Amplifiers: RAs) 16 (RA-1 and RA-7); and receiving OSC units 17 (17-1 and 17-2).

The optical cross-connect switch 11 includes a switch (SW) 18 for performing switching operations of output routes for each of a plurality of (n (n is an natural number)) wavelength components ($\lambda(1)$ to $\lambda(n)$: n is a natural number) inputted to itself; a multiplexer (MUX) 19 that can synthesize (multiplex) the plurality of wavelength components received from the switch 18 and output the multiple optical signal (WDM optical signal) including the plurality of multiplexed wavelength components to the transmitting amplifier 12; and a demultiplexer (DMUX) 19A that can receive the WDM optical signal from the receiving amplifier 16 and separate (demultiplex) this WDM optical signal for each wavelength component.

In FIG. 2A, the multiplexer 19 and the demultiplexer 19A are prepared for each transmitting or receiving route. To be specific, a multiplexer 19-1 corresponding to the first transmitting route, a multiplexer 19-2 corresponding to the second transmitting route, a demultiplexer 19A-1 corresponding to the first receiving route, and a demultiplexer 19A-2 corresponding to the second receiving route are prepared.

According to the foregoing configurations, the optical cross-connect switch 11 can branch (demultiplex), output, and pass a part of the wavelength component inputted to the switch 18 and further synthesize (multiplex) the plurality of wavelength components.

The transmitting amplifier 12 optically amplifies the WDM optical signal received from the multiplexer 19.

The transmitting OSC unit 13 includes a control circuit (CONT.) 131 and an electrical/optical conversion module (E/O Mod.) 132. The control circuit 131 gives the various information (electrical signal), such as optical signal information, various OH (Over Head) information, in-unit (in-device) information, and the like, to the electrical/optical conversion module 132. The electrical/optical conversion module 132 gives the information (OSC optical signal) converted into the optical signal by the electrical/optical conversion, to the optical fiber coupler 14.

The optical fiber coupler 14 multiplexes the WDM optical signal received from the transmitting amplifier 12 and the OSC optical signal (different in wavelength from the WDM signal from the amplifier 12) received from the transmitting OSC unit 13 to transmit the multiplexed optical signal to the optical fiber.

On the other hand, the optical fiber coupler 15 separates (demultiplexes) the multiple optical signal received from the optical fiber into the WDM optical signal and the OSC optical signal, gives the WDM optical signal to the receiving amplifier 16 and gives the OSC optical signal to the receiving OSC unit 17.

The receiving OSC unit 17 has an optical/electrical conversion module (O/E Mod.) 171 and a control circuit (CONT.) 172. The control circuit 172 receives the information that is converted into the electric signal by the optical/electrical conversion module 171, and carries out a necessary process based on the information. The receiving amplifier 16 optically amplifies the multiple optical signal outputted from the optical fiber coupler 15 and gives the multiple optical signal to the demultiplexer 19A of the optical cross-connect switch 11.

The configuration of the optical transmitter/receiver 10 as mentioned above can be applied in its original state to the configuration of the optical transmitter/receiver 20 shown in FIG. 2B. Thus, the explanation of the components of the optical transmitter/receiver 20 is omitted.

Also, in FIG. 2A, each of the NEs 1 and 2 has the components similar to the optical transmitter/receiver 10. That is, each includes: a cross connection unit (optical cross-connect switch) 21 (including: a switch 28; multiplexers 29 and 39, and demultiplexers 30 and 40); a transmitting amplifier 22 (TA-2 or TA-3) related to the repeating of the multiple optical signal from the optical transmitter/receiver 10 to the optical transmitter/receiver 20; a transmitting OSC unit 23 (including: a control circuit (CONT.) 231 and an electrical/optical conversion module (E/O Mod.) 232); an optical fiber coupler 24 for multiplexing and an optical fiber coupler 25 for demultiplexing; a receiving amplifier 26 (RA-2 or RA-3); and a receiving OSC unit 27 (including an optical/electrical conversion module (O/E Mod.) 271 and a control circuit (CONT.) 272). Moreover, each of the NEs 1 and 2 includes: a transmitting amplifier 32 (TA-5 or TA-6) related to the repeating of the multiple optical signal from the optical transmitter/receiver 20 to the optical transmitter/receiver 10; a transmitting OSC unit 33 (including a control circuit 331 and an electrical/optical module (E/O Mod.) 332); an optical fiber coupler 34 for multiplexing; an optical fiber coupler 35 for demultiplexing; a receiving amplifier 36 (RA-5 or RA-6); and a receiving OSC unit 37 (including an optical/electrical conversion module (O/E Mod.) 371 and a control circuit (CONT.) 372).

Also, each of the respective NEs 3 to 5 in FIG. 2B has the configuration similar to the configuration of each of the NEs 1 and 2 as mentioned above. Thus, the explanation is omitted. According to this configuration, each of the optical transmitter/receivers 10 and 20 can function as one of the NEs in the transmission of the optical signal and can be regarded as the NE.

<Transmission Route Determination Method>

The embodiment of the determination method for the transmission route of the WDM optical signal according to the present invention will be described below by exemplifying the optical multiplexing transmission system shown in FIG. 1, FIG. 2A, and FIG. 2B. In the foregoing optical multiplexing transmission system, in the example case where the optical transmitter/receiver 10 is assumed to be the transmitting side of the information and the optical transmitter/receiver 20 is assumed to be the receiving side of the information, one of the foregoing first and second routes can be selected for transmitting the information from the optical transmitter/receiver 10 to the optical transmitter/receiver 20.

In the present invention, the transmission route is determined by the following methods.

<1> The route where the number of the wavelength components have been in-use in each section (block) of the transmission route is the smallest is selected (first transmission route determination method).

<2> The route where the number of the repeaters (the repeating NE number) on the transmission route is the smallest is selected (second transmission route determination method).

<3> The route where a transmission distance is the shortest is selected (third transmission route determination method).

The first to third transmission route determination methods will be described below.

<<First Transmission Route Determination Method>>

The embodiment of the first transmission route determination method will be described below referring to FIGS. 3 to 5. In the first transmission route determination method, the numbers of the wavelength components have been in-use in the respective sections of the respective transmission routes are respectively calculated, and the route where the number is the smallest is selected.

In the example shown in FIG. 1, for example, as the transmission routes through which the optical transmitter/receiver 10 transmits the optical signal to the optical transmitter/receiver 20, there are the first and second transmitting routes. The first transmitting route, as sections included in the first transmitting route, has a section between the optical transmitter/receiver 10 and the NE1 (hereafter, referred to as "first section"), a section between the NE1 and the NE2 (hereafter, referred to as "second section"), and a section between the NE 2 and the optical transmitter/receiver 20 (hereafter, referred to as "third section") On the other hand, the second transmitting route, as sections included in the second transmitting route, has a section between the optical transmitter/receiver 10 and the NE3 (hereafter, referred to as "fourth section"), a section between the NE3 and the NE4 (hereafter, referred to as "fifth section"), a section between the NE 4 and the NE 5 (hereafter, referred to as "sixth section"), and a section between the NE 5 and the optical transmitter/receiver 20 (hereafter, referred to as "seventh section").

Figure 3:
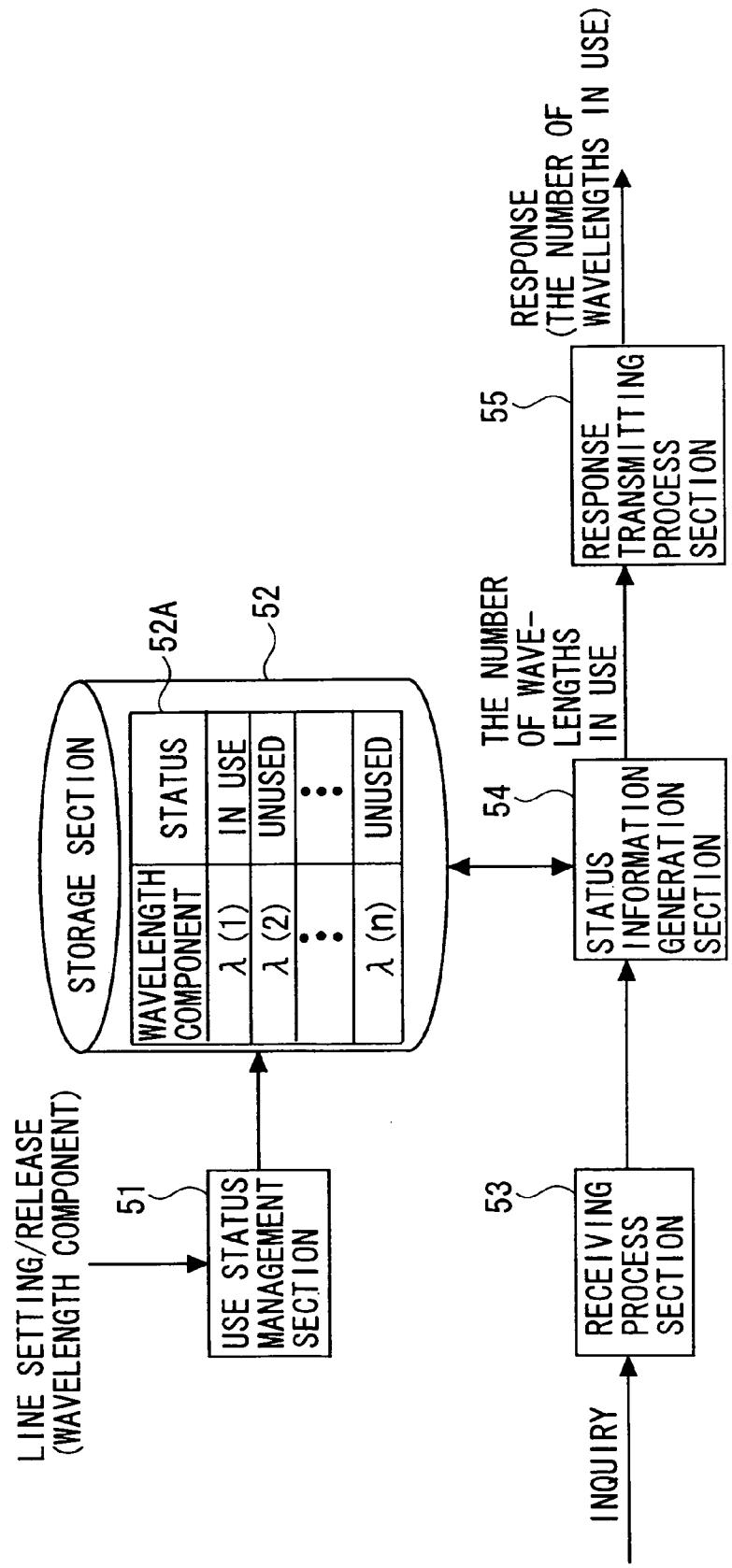
FIG. 3 is a block diagram showing main functions provided to respective NEs and an optical receiver on a transmission route in order to attain a first transmission route determination method.
Figure 4:
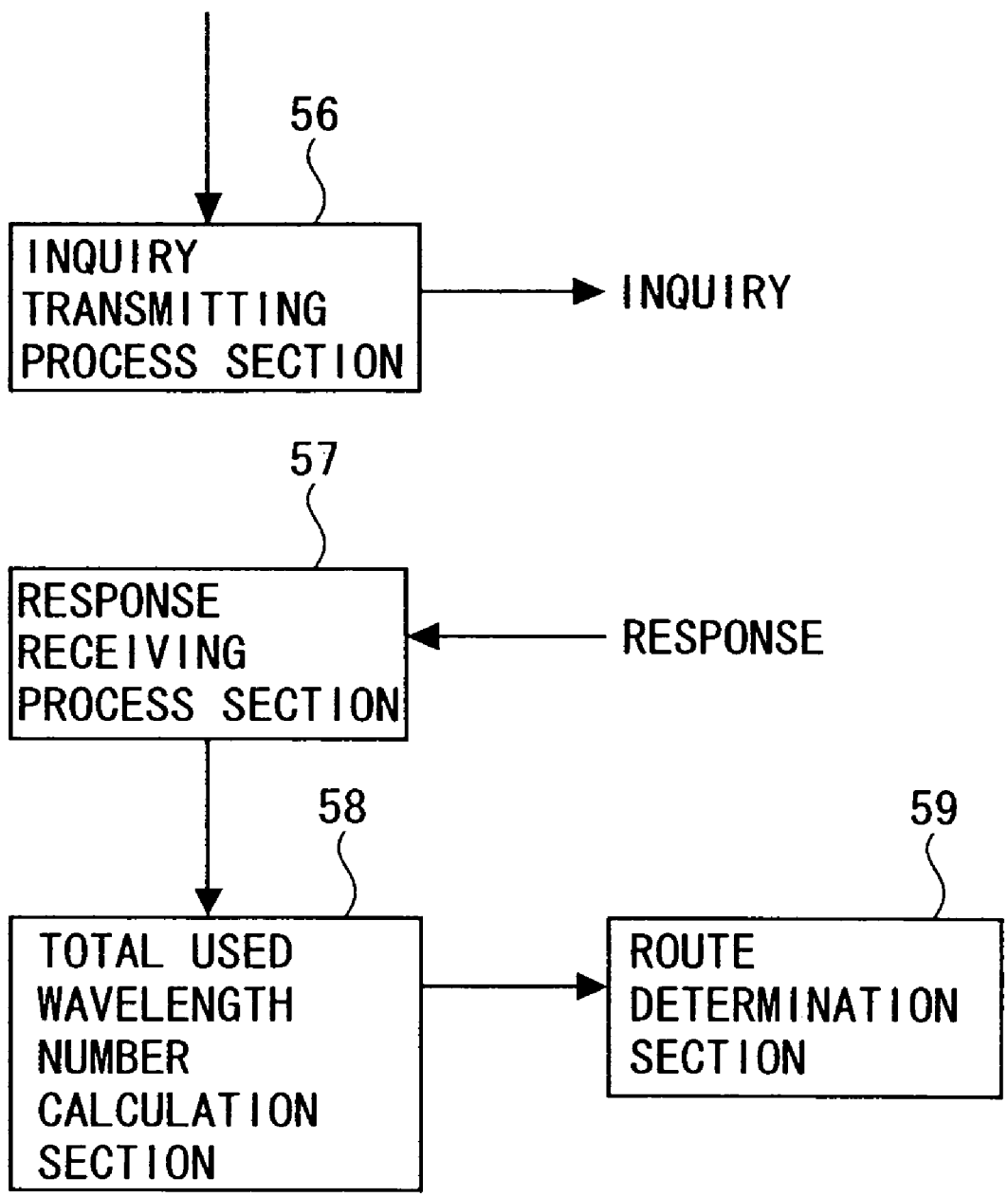
FIG. 4 is a block diagram showing main functions provided to an optical transmitter on the transmission route in order to attain the first transmission route determination method.

The optical transmitter/receivers 10 and 20 and the respective NEs 1 to 5 have the configurations as shown in FIG. 3 and FIG. 4, in order to attain the first transmission route determination method. FIG. 3 is a block diagram showing the functions provided to each of the NEs 1 to 5 and optical transmitter/receiver 20, and FIG. 4 is a block diagram showing the functions provided to the optical transmitter/receiver 10.

As shown in FIG. 3, each of the NEs 1 to 5 and optical transmitter/receiver 20 may include: a use status management section 51 for managing the use statuses of wavelength components ($\lambda(1)$ to $\lambda(n)$) used to transmit the WDM optical signal in the section between it and a node (the optical transmitter/receiver 10 or different NE) located at the former stage thereof; a use status storage section 52 for storing information indicative of the use status of each wavelength component; a receiving process section 53 for executing a receiving process of an inquiry of the number of the wavelength components each having an in-use status; a status information generation section 54 for generating status information from the information stored in the use status storage section; and a response transmitting process section 55 for executing a response process for transmitting a response including the status information to an inquiry source.

The respective optical transmitter/receivers 10 and 20 and the respective NEs 1 to 5 are configured to assign one wavelength component per line, in each section. The use status storage section 52 stores a table 52A indicating the use status (in-use/unused (not-in-use)) of each wavelength component in the corresponding section.

The use status management section 51 receives information, which in accordance with the setting/release of a line (the allocation/allocation release of the wavelength component), indicates the wavelength component related to the setting/release, from a line setting section (not shown), and updates the use status of the appropriate wavelength component in the foregoing table 52A.

The receiving process section 53, when receiving an inquiry of the number of wavelengths in-use (the used wavelength number) from the inquiry source, passes this inquiry to the status information generation section 54.

The status information generation section 54 generates status information based on contents of the table 52A. For example, the status information generation section 54 calculates the number of the wavelength components (used wavelength number) in which the status is "in-use", and passes this used wavelength number as the status information to the response transmitting process section 55. The response transmitting process section 55 generates a response including the used wavelength number to transmit the response to the inquiry source.

On the other hand, as shown in FIG. 4, the optical transmitter/receiver 10 may include an inquiry transmitting process section 56 for executing a transmitting process of an inquiry; a response receiving process section 57 for executing a reception of the response to the inquiry; a total used wavelength number calculation section 58 for calculating a total value (referred to as "total used wavelength number") of the number of wavelength components with the status "in-use" for each transmission route; and a route determination section 59 for using the total used wavelength number for each transmission route to determine the transmission route.

The inquiry transmitting process section 56 is started, for example, when a request for addition of a new line between the optical transmitter/receivers 10 and 20 is given, and transmits the inquiry of the used wavelength number between the respective sections to a inquiry destination (i.e., the NEs 1 to 5 and optical transmitter/receiver 20).

The response receiving process section 57, when receiving the response from the inquiry destination (the NEs 1 to 5 and optical transmitter/receiver 20), passes the used wavelength number included therein, to the total used wavelength number calculation section 58.

The total used wavelength number calculation section 58 receives the used wavelength numbers of the respective sections, adds the used wavelength number for each transmission route, calculates the total used wavelength number for each transmission route, and passes to the route determination section 59.

The route determination section 59 compares the total used wavelength numbers and determines the transmission route whose total used wavelength number is the smallest, as the transmission route to be applied to a target line (new line) to be added.

After that, the wavelength components used in the respective sections of the determined transmission route are respectively determined from the wavelength components in the unused statuses in the respective sections. At this time, it is preferred to adopt a configuration where the same wavelength component is used in each section as much as possible. Alternatively, in order that the same wavelength component is used in continuous sections on the transmission route as much as possible (namely, the wavelength component of each section is determined so that the number of change portions of the wavelength component between a start point and end point of the transmission route is the minimum), it is preferred to adopt the configuration where the wavelength component of each section is selected. Alternatively, in each section, it is allowable to configure to select the wavelength component when the transmission property of each wavelength component included in the WDM optical signal transmitted through the section becomes the best condition.

Then, an instruction for the line setting in each section is given to the NEs and optical transmitter/receiver 20 which are located on the determined transmission route.

The foregoing inquiry is sent from the inquiry transmitting process section 56 to the respective transmitting OSC units (FIG. 2A: 13-1 and 13-2) of the optical transmitter/receiver 10 and included into the OSC optical signal. The OSC optical signal is sent to the respective NEs 1 to 5 and the optical transmitter/receiver 20 through the first and second transmitting routes. In the respective NEs 1 to 5 and the optical transmitter/receiver 20, the inquiry is given to the receiving process section 53 through the respective OSC units (FIG. 2A and FIG. 2B: 27 of the respective NEs 1 to 5 and 17 of the optical transmitter/receiver 20). Then, the foregoing process is executed.

The responses are sent from the response transmitting process section 55 of the respective NEs 1 to 5 and optical transmitter/receiver 20 to the transmitting OSC units (FIG. 2A and FIG. 2B; 17-1 and 17-2 of the optical transmitter/receiver 20 and 33 of the respective NEs 1 to 5) and included into the OSC optical signal. The OSC optical signal is sent to the optical transmitter/receiver 10 through the first and second receiving routes, and given to the response receiving process section 57 through the respective receiving OSC sections (FIG. 2A: 13-1 and 13-2 of the optical transmitter/receiver 10).

The transmitting/receiving of the inquiry and response may be configured to be performed through the one-to-one communication between the inquiry source and the inquiry destination. Alternatively, it may be configured such that the drop-in and drop-out process of the OSC optical signal in the respective NEs (including the optical transmitter/receiver 20) causes the inquiry for each transmission route to go around on the ring constituted by the combination of the first or second transmitting route and the first or second receiving route, and the response is meanwhile added to the inquiry in each NE, and the response receiving process section 57 receives the inquiry for each transmission route to which the response is added.

The determination of the wavelength component of each section in the transmission route determined by the route determination section 59 can be configured such that the inquiry source gathers the information necessary for the determination in the transmitting/receiving of the foregoing inquiry and response.

For example, it is configured such that the status information generation section 54 generates the status information including the identification information of the unused wavelength component together with the used wavelength number, and the response including the status information with the identification information is returned to the inquiry source. In this case, the identification information of the unused wavelength component included in the response can be used to determine the wavelength component of each section. Accordingly, it is not necessary to separately inquire the unused wavelength component of each section.

Alternatively, it is configured such that the response including the content itself of the table 52A as the status information is returned to the inquiry source. In this case, it becomes the configuration where the used wavelength number of each section is calculated on the inquiry side. Also, the unused wavelength component in each section can be specified from the content of the table 52A in each section.

Moreover, a filter can be set for the determination of the transmission route. For example, it can be configured such that the fact that the used wavelength number in a particular or arbitrary section exceeds a predetermined threshold is set as a filter condition, and the transmission route agreeing with the filter condition (having the section where the used wavelength number exceeds the threshold) is removed from the transmission route of a selection target. Accordingly, it is possible to control the increase in a load caused by the setting of the new line for the section.

In this case, for example, it is configured such that a filter process section is provided between the response receiving process section 57 and the total used wavelength number calculation section 58 in FIG. 4, and the filter process section does not give the used wavelength number related to the transmission route of a removal target, to the total used wavelength number calculation section 58. Alternatively, it may be configured such that the filter condition is set for the particular or all inquiry destinations, respectively, and the inquiry destination judges whether or not the used wavelength number agrees with the filter condition, whose result is sent to the inquiry source, before the transmission route is removed. In this case, it can be configured such that the status information generation section 54 generates the information indicative of the agreement with the filter condition instead of the used wavelength number as the status information.

Figure 5:
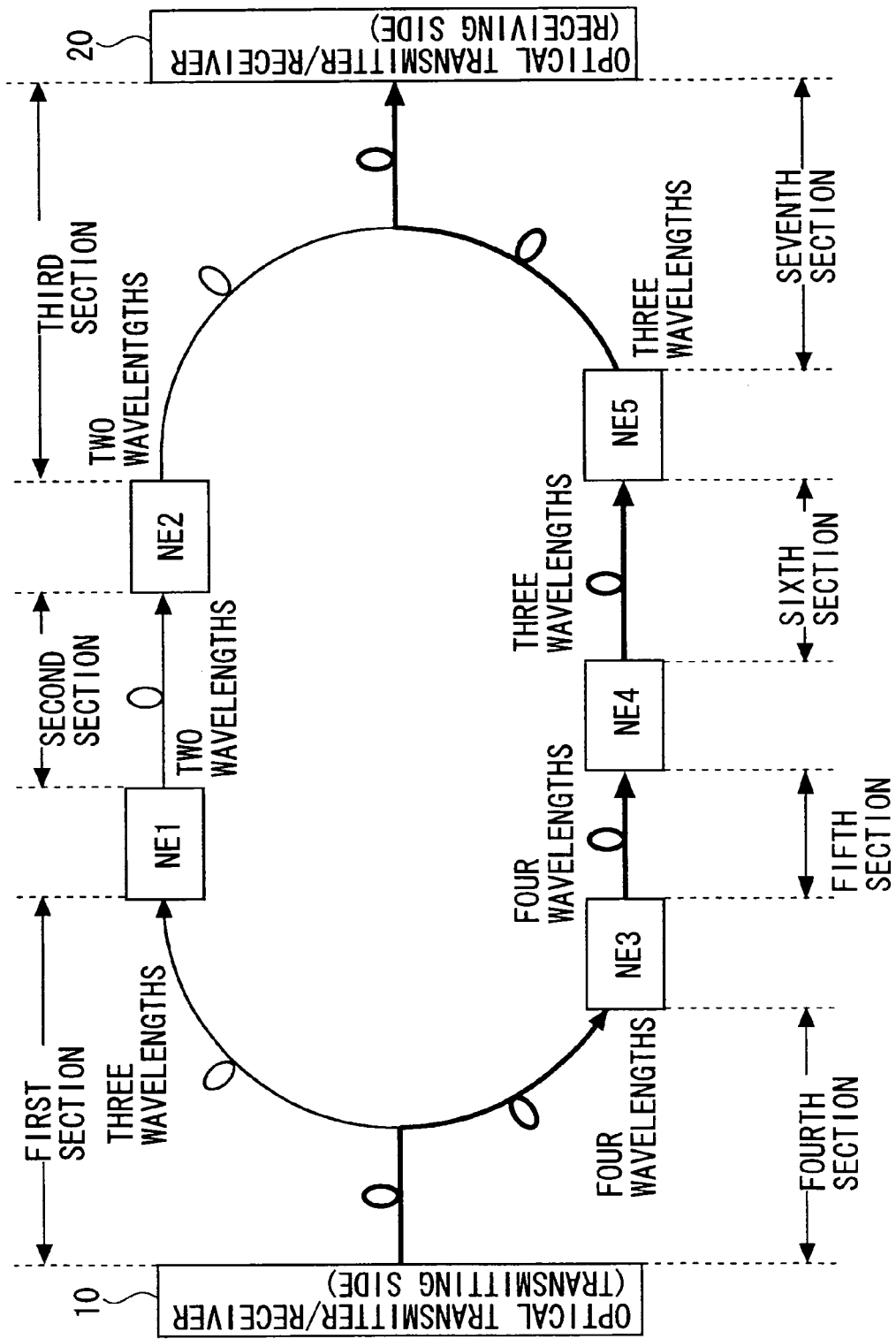
FIG. 5 is an operation explanation diagram of the first transmission route determination method.

FIG. 5 is an operation explanation diagram of the first transmission route determination method. In the example shown in FIG. 5, the used wavelength number of the first section constituting the first transmitting route is 3, the used wavelength number of the second section is 2, and the used wavelength number of the third section is 2. On the other hand, the used wavelength number of the fourth section constituting the second transmitting route is 4, the used wavelength number of the fifth section is 4, the used wavelength number of the sixth section is 3, and the used wavelength number of the seventh section is 3. In this case, the total used wavelength number of the first transmitting route is 7, and the total used wavelength number of the second transmitting route is 14. Thus, the first transmitting route is determined as the route applied to the line (between the optical transmitter/receivers 10 and 20) of the addition target.

However, when the filter condition is set for a certain section, for example, when the threshold of the used wavelength number in the second section is set to 10, if the used wavelength number in the second section exceeds 10, even if the total used wavelength number in the second transmitting route exceeds the total used wavelength number in the first transmitting route, the second transmitting route is selected.

In the route determination, if there is a plurality of smallest total used wavelength numbers, one transmission route is selected based on a predetermined priority order.

It can be configured such that the optical transmitter/receiver 20 has the configuration as the inquiry source as shown in FIG. 4, the optical transmitter/receiver 10 has the configuration as the inquiry destination as shown in FIG. 3, and the transmission route from the optical transmitter/receiver 20 to the optical transmitter/receiver 10 is determined.

Also, in the above-mentioned example, the example case where the transmission route is determined by the optical transmitter/receiver 10 is explained. In contrast, the network controller 30 can be configured to inquire the used wavelength number to the NE (including the optical transmitter/receiver) on each transmission route and determine the transmission route. Also, the functions possessed by the inquiry source as mentioned above can be attained by the cooperation between the optical transmitter/receiver on the transmitting side and the network controller.

The functions related to the first transmission route determination method as shown in FIG. 3 and FIG. 4 can be attained by, for example, a software process where a processor such as CPU executes a predetermined program, a hardware process using a dedicated chip, or the combination of the software process and the hardware process. This fact is similar in the second and third transmission route determination methods, the used wavelength determination method for each line section and the correction (adjustment) method of the line transmission property, which will be described later.

<<Second Transmission Route Determination Method>>

The second transmission route determination method will be described below referring to FIGS. 6 to 8. The second transmission route determination method selects a route where the number (repeating NE number) of the repeaters (repeater stations) on the transmission route is the smallest.

Figure 6:
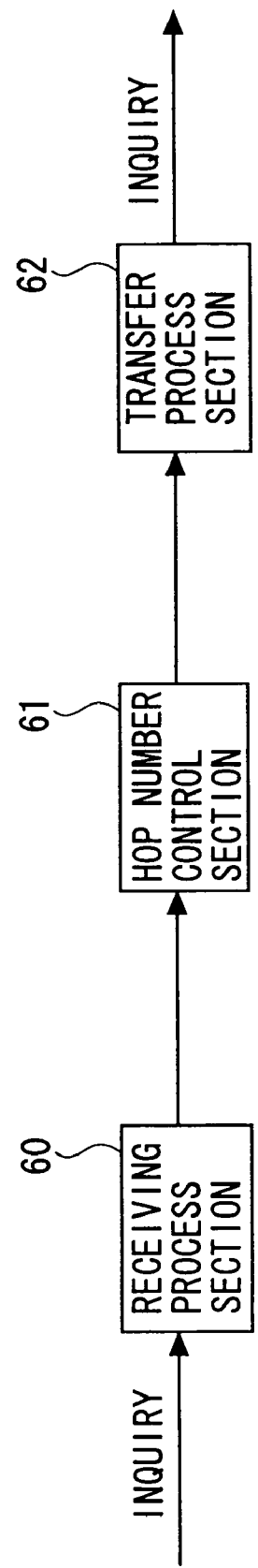
FIG. 6 is a block diagram showing main functions provided to respective NEs on a transmission route in order to attain a second transmission route determination method.
Figure 7:
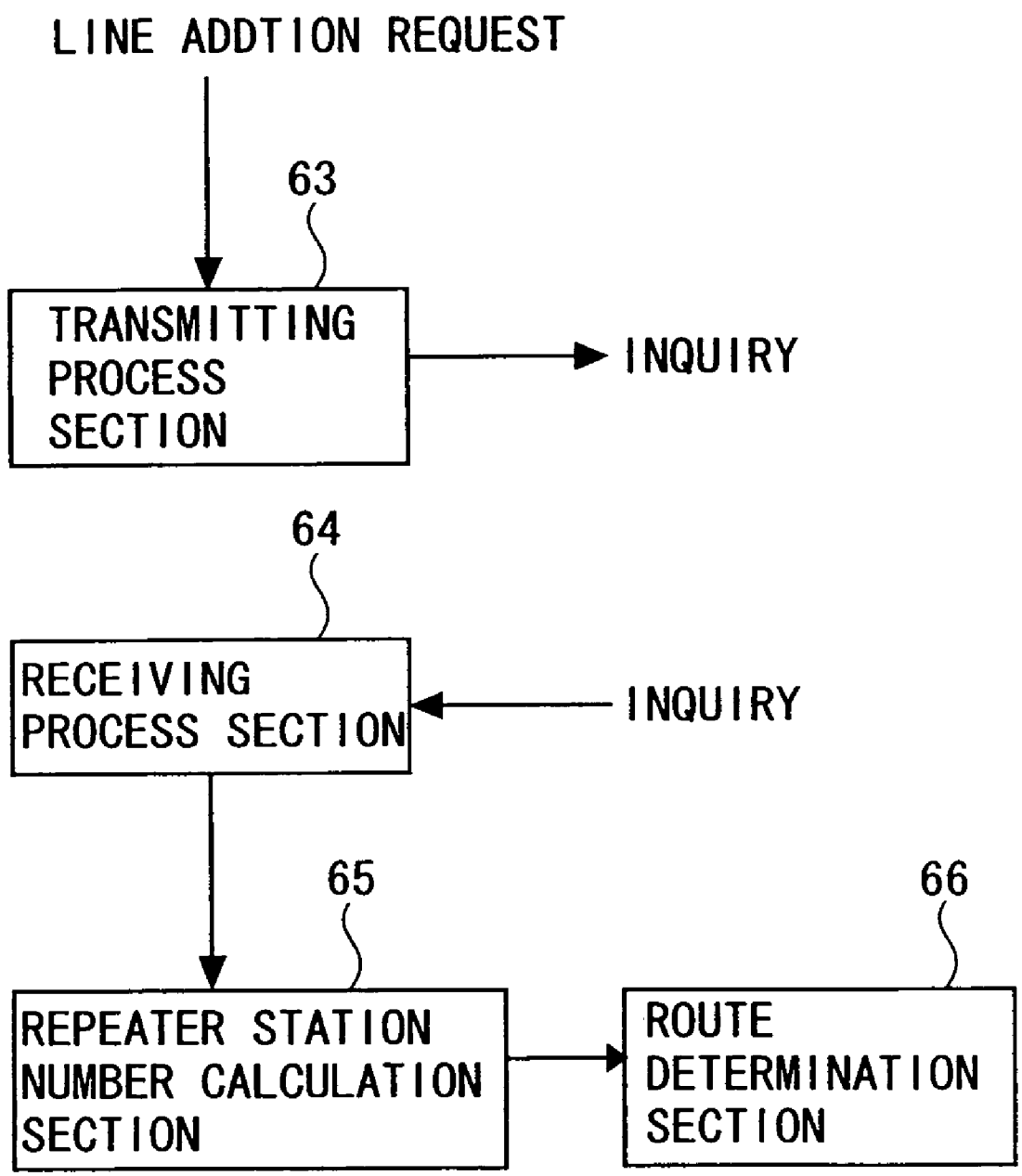
FIG. 7 is a block diagram showing main functions provided to the optical transmitter on the transmission route in order to attain the second transmission route determination method.

The optical transmitter/receivers 10 and 20 and the respective NEs 1 to 5 have the configurations as shown in FIG. 6 and FIG. 7, in order to attain the second transmission route determination method. FIG. 6 is a block diagram showing the functions provided to each of the NEs 1 to 5 and optical transmitter/receiver 20, and FIG. 7 is a block diagram showing the functions provided to the optical transmitter/receiver 10.

As shown in FIG. 6, each of the NEs 1 to 5 of the inquiry destination may include: a receiving process section 60 for executing a receiving process to inquire the number of repeating NEs; a hop number control section 61 for controlling a hop number included in the inquiry; and a transfer process section 62 for executing a transferring process of the inquiry.

The receiving process section 60 is configured to receive the inquiry included in the OSC optical signal received by the receiving OSC unit (27 of the respective NEs 1 to 5) on the transmitting route. The inquiry includes a value (referred to as "hop number value") used to detect the hop number such as TTL (Time to Live). The hop number control section 61, when receiving the inquiry from the receiving process section 60, executes a process of adding or subtracting a predetermined value (for example, 1) to or from the hop number value to pass the resultant to the transfer process section 62. The transfer process section 62 passes the inquiry to the transmitting OSC unit (23 of the respective NEs 1 to 5). Accordingly, the OSC optical signal including the inquiry is sent out from the transmitting OSC unit, and transferred to the repeater station (NE) located at the later stage of the transmitting route.

In this way, with the drop-in and drop-out process of the OSC optical signal carried out by the repeater station (NE) on the transmitting route, the hop number value included in the inquiry is added or subtracted by the predetermined number by the repeater station (NE) on the transmitting route. Then, the inquiry finally arrives at the optical transmitter/receiver 20 that is the end point of the transmitting route. The optical transmitter/receiver 20, when receiving the inquiry, returns the inquiry to the optical transmitter/receiver 10 through the first or second receiving route.

On the other hand, as shown in FIG. 7, the optical transmitter/receiver 10 serving as the inquiry source may include: a transmitting process section 63 which is started by a request for addition of a new line from the optical transmitter/receiver 10 to the optical transmitter/receiver 20 to execute the transmitting process of the inquiry to transmit the inquiry with the hop number value of a default value to each transmitting route; a receiving process section 64 for executing a receiving process of the inquiry that is returned through each transmitting route; a repeater station number calculation section 65 for calculating a repeater station number on each transmitting route based on a difference between the hop number value included in the inquiry from the receiving process section 64 and the default value; and a route determination section 66 for receiving the repeater station number for each transmitting route from the repeater station number calculation section 65 to compare them, and determining the transmitting route where the repeater station number is the smallest, as the route to be used in the target line to be added.

Similarly to the first route determination method, the inquiries outputted by the transmitting process section 63 are given to the transmitting OSC units respectively corresponding to the first and second transmitting routes, and the OSC optical signals including the inquiries are sent onto the transmitting route. Also, the receiving process section 64 receives the inquiries included in the OSC optical signals received by the receiving OSC units respectively corresponding to the first and second receiving routes.

Figure 8:
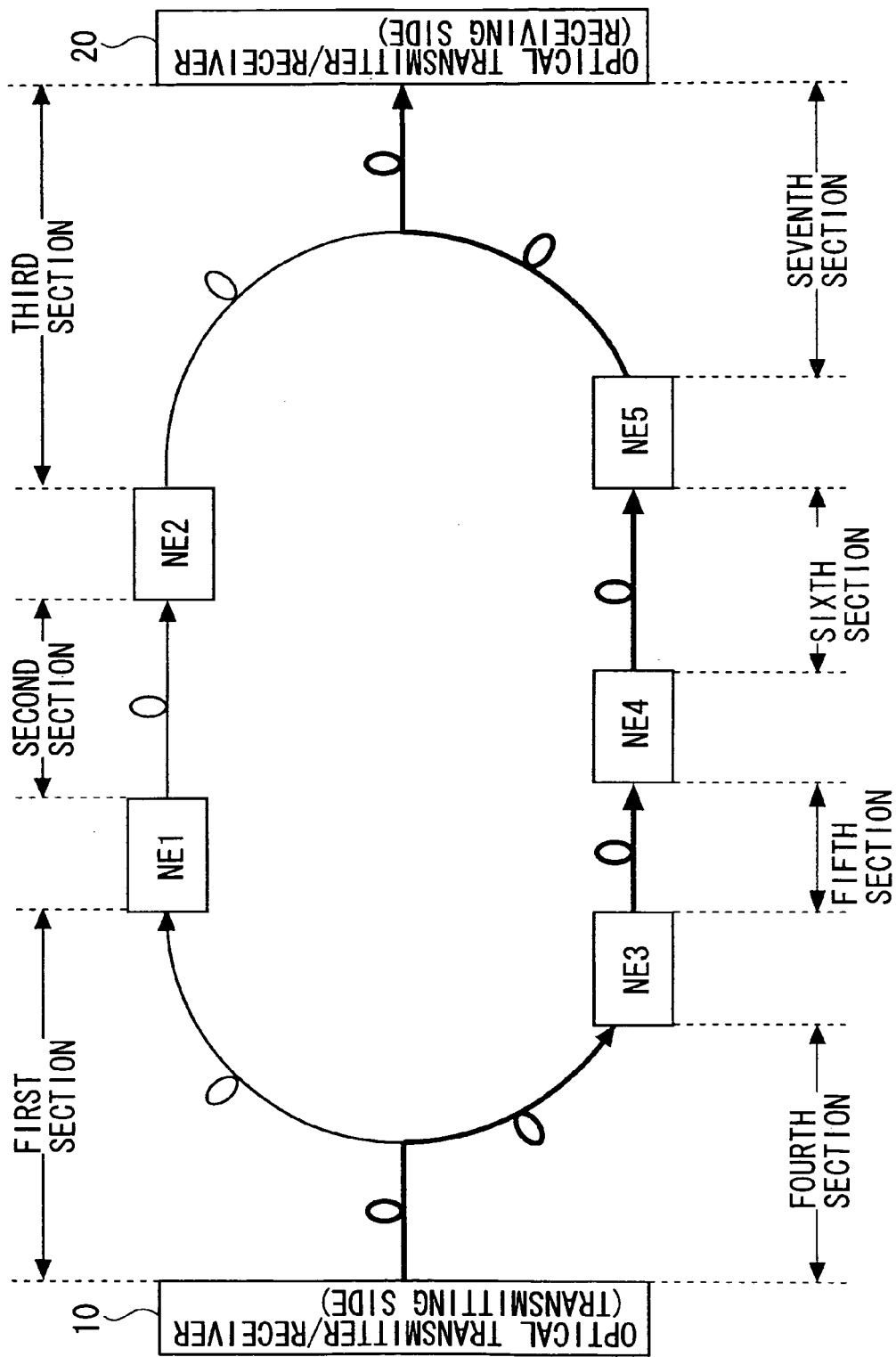
FIG. 8 is an operation explanation diagram of the second transmission route determination method.

FIG. 8 is an operation explanation diagram of the second transmission route determination method. In the example shown in FIG. 8, the repeater station number in the first transmitting route is 2, and the repeater station number in the second transmitting route is 3. Thus, the first transmitting route is determined as the route applied to the line (between the optical transmitter/receivers 10 and 20) of the addition target. In the route determination, if there are the plurality of smallest repeater station numbers, one transmission route is selected based on the predetermined priority order.

After that, the wavelength component used in each section of the determined transmission route is determined, the line setting instruction is given to the respective NEs (including the optical transmitter/receiver 20), and the appropriate line is set. The same determination method for the wavelength component explained in the first transmission route determination method can be applied to the second transmission route determination method.

It can be configured such that the optical transmitter/receiver 20 has the configuration as the inquiry source as shown in FIG. 7, the optical transmitter/receiver 10 has the configuration as the inquiry destination as shown in FIG. 6, and the transmission route from the optical transmitter/receiver 20 to the optical transmitter/receiver 10 is determined.

Also, in the above-mentioned example, the example case where the transmission route is determined by the optical transmitter/receiver 10 is explained. In contrast, the network controller 30 can be configured to obtain the repeater station number on each transmission route obtained by the optical transmitter/receiver 10 by using the foregoing method and determine the transmission route.

<<Third Transmission Route Determination Method>>

The third transmission route determination method will be described below referring to FIGS. 9 to 11. The third transmission route determination method selects the route where a transmission distance is the shortest.

Figure 9:
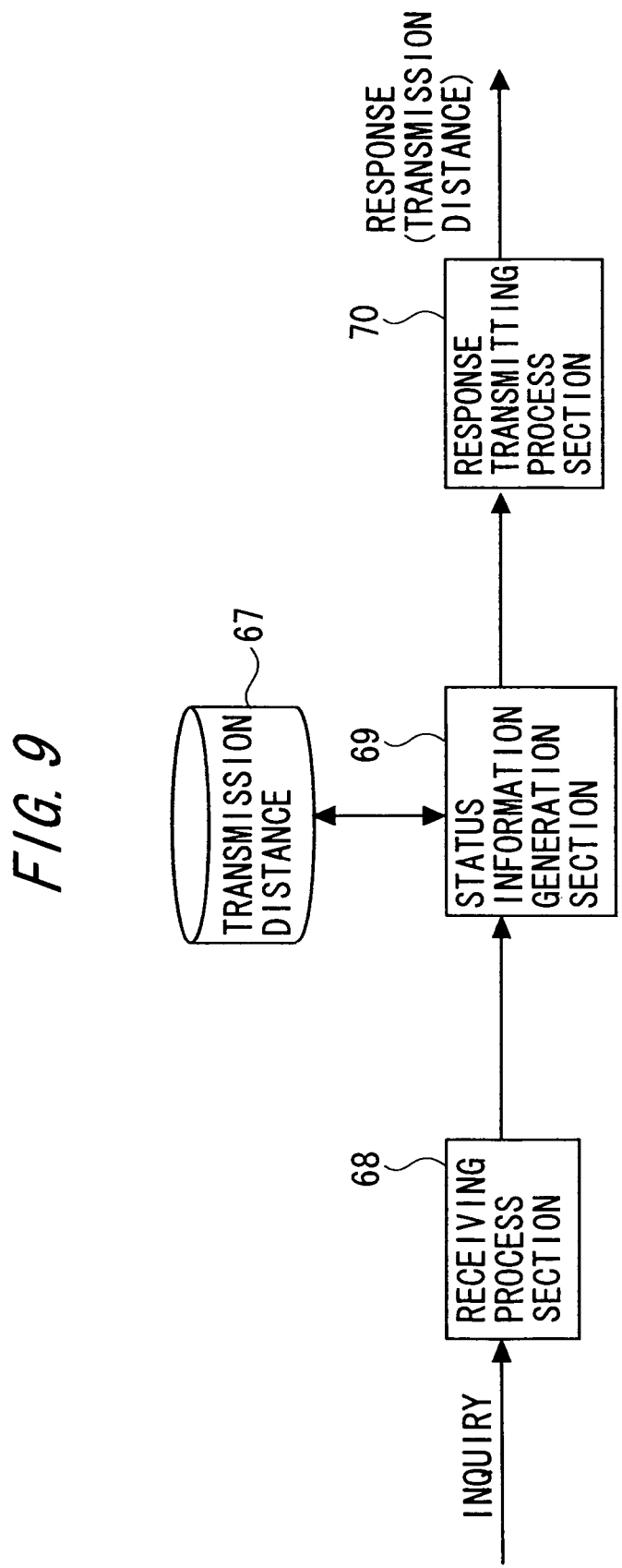
FIG. 9 is a block diagram showing main functions provided to respective NEs and optical receiver on a transmission route in order to attain a third transmission route determination method.
Figure 10:
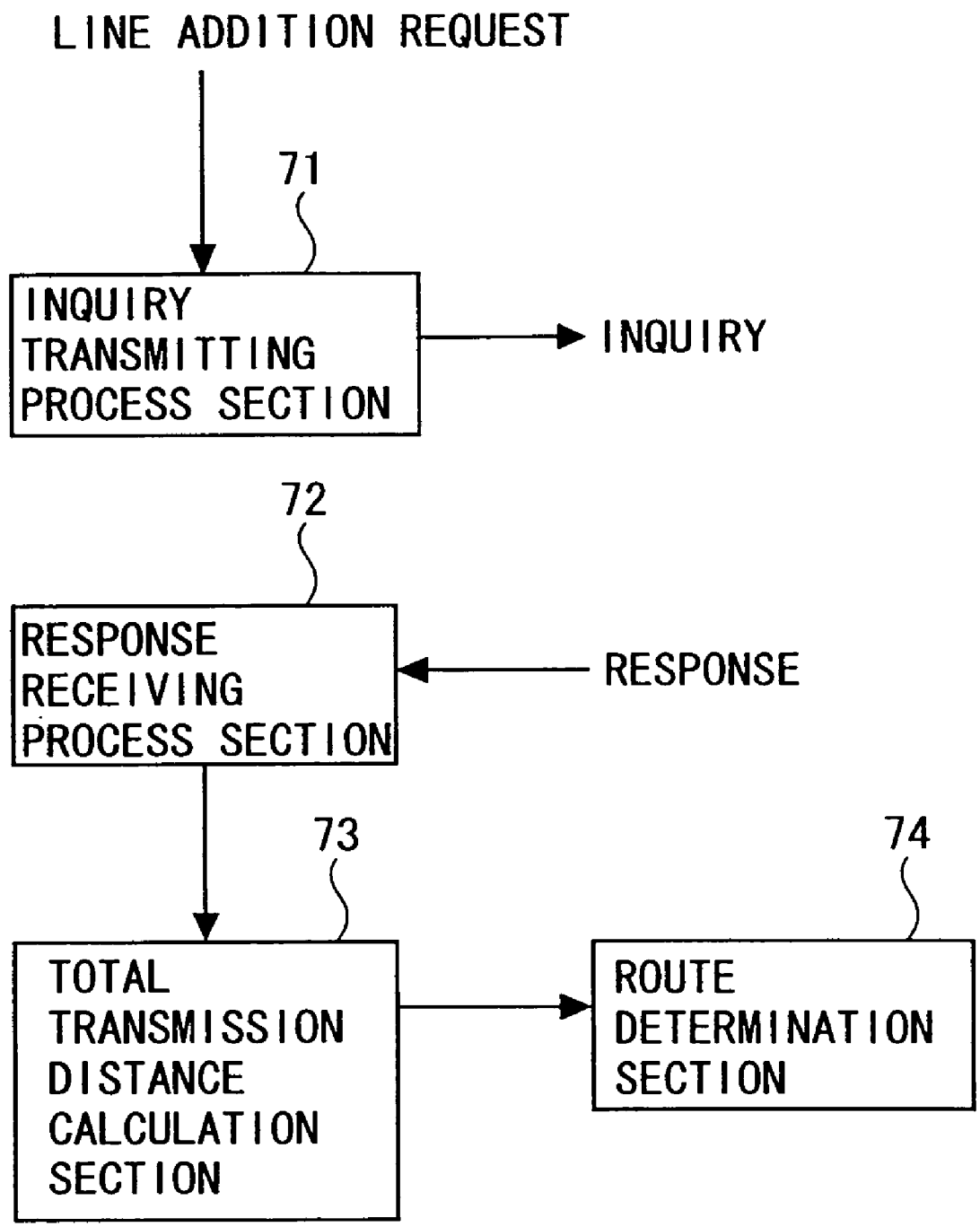
FIG. 10 is a block diagram showing main functions provided to the optical transmitter on the transmission route in order to attain the third transmission route determination method.

The optical transmitter/receivers 10 and 20 and the respective NEs 1 to 5 have the configurations as shown in FIG. 9 and FIG. 10, in order to attain the third transmission route determination method. FIG. 9 is a block diagram showing the functions provided to each of the NEs 1 to 5 and optical transmitter/receiver 20, and FIG. 10 is a block diagram showing the functions provided to the optical transmitter/receiver 10.

As shown in FIG. 9, each of the NEs 1 to 5 and optical transmitter/receiver 20 may include a transmission distance storage section 67 for storing information indicative of the transmission distance of the section between it and the node (the optical transmitter/receiver 10 or the different NE) located at the former stage thereof, a receiving process section 68 for executing a receiving process of the inquiry of the transmission distance; a status information generation section 69 for generating status information based on the information stored in the transmission distance storage section 67, and a response transmitting process section 70 for executing a process for transmitting a response including the status information to the inquiry source.

The transmission distance storage section 67 stores a table (not shown) indicating the transmission distance for each section. The receiving process section 68, when receiving the inquiry of the transmission distance from the inquiry source, passes the inquiry to the status information generation section 69.

The status information generation section 69 generates the status information based on the content of the table. For example, the status information generation section 69 reads the transmission distance of the section related to the inquiry from the transmission distance storage section 67 to pass the read transmission distance as the status information to the response transmitting process section 70. The response transmitting process section 70 generates the response including the transmission distance and transmits the response to the inquiry source.

On the other hand, as shown in FIG. 10, the optical transmitter/receiver 10 may include an inquiry transmitting process section 71 for executing the transmitting process of the inquiry, a response receiving process section 72 for executing the receiving process of the response to the inquiry, a total transmission distance calculation section 73 for calculating the total value (hereafter, referred to as "total transmission distance") of the transmission distances for each transmission route, and a route determination section 74 for determining the transmission route by using the total transmission distance for each transmission route.

The inquiry transmitting process section 71 is started, for example, when a request for addition of a new line between the optical transmitter/receivers 10 and 20 is given, and transmits the inquiry of the transmission distance in each section to the inquiry destinations (the NEs 1 to 5 and the optical transmitter/receiver 20).

The response receiving process section 72, when receiving the response from the inquiry destination (the NEs 1 to 5 and the optical transmitter/receiver 20), passes the transmission distance included in the response to the total transmission distance calculation section 73.

The total transmission distance calculation section 73 receives the transmission distance of each section, adds the transmission distances for each transmission route, calculates the total transmission distance for each transmission route, and passes the resultant to the route determination section 74.

The route determination section 74 compares the total transmission distances to determine the transmission route where the total transmission distance is the shortest, as the transmission route to be applied to the target line to be added.

After that, the wavelength components used in the respective sections of the determined transmission route are respectively determined from the wavelength components with the unused statuses in the respective sections. The various methods explained in the first transmission route determination method can be applied to the determination method for the wavelength component of each section in this case.

Then, an instruction for the line setting of each section is given to the NE and optical transmitter/receiver 20 which are located on the determined transmission route, and the setting process for the corresponding line is executed.

The foregoing inquiry is sent from the inquiry transmitting process section 71 to the respective transmitting OSC units of the optical transmitter/receiver 10 and included into the OSC optical signal. The OSC optical signal is given to the respective NEs 1 to 5 and the optical transmitter/receiver 20 through the first and second transmitting routes. In the respective NEs 1 to 5 and the optical transmitter/receiver 20, the inquiry is given to the receiving process section 68 through the respective receiving OSC units, and the foregoing processes are executed. The response is sent from the response transmitting process sections 70 of the respective NEs 1 to 5 and optical transmitter/receiver 20 to the transmitting OSC units and included into the OSC optical signal. The OSC optical signal is received by the optical transmitter/receiver 10 through the first and second receiving routes, and given to the response receiving process section 72 through the respective receiving OSC units.

The various methods explained in the first transmission route determination method can be applied to the transmitting/receiving of the inquiry and response in the third transmission route determination method. Also, in the determination of the wavelength component of each section in the transmission route, it can be configured such that with the method similar to the first transmission route determination method, the inquiry source gathers the information required to determine the wavelength component of each section in the transmitting/receiving of the inquiry and response.

Moreover, the filter can be set for the determination of the transmission route. For example, it can be configured such that the fact that the transmission distance in the particular or arbitrary section exceeds a preset threshold is set as the filter condition, and the transmission route agreeing with this filter condition (having the section where the transmission distance exceeds the threshold) is removed from the transmission route of the selection target. Accordingly, it is possible to control the increase in the load caused by the setting of the new line for the section. The various methods explained in the first transmission route determination method can be applied to the setting of the filter and the filtering process.

Figure 11:
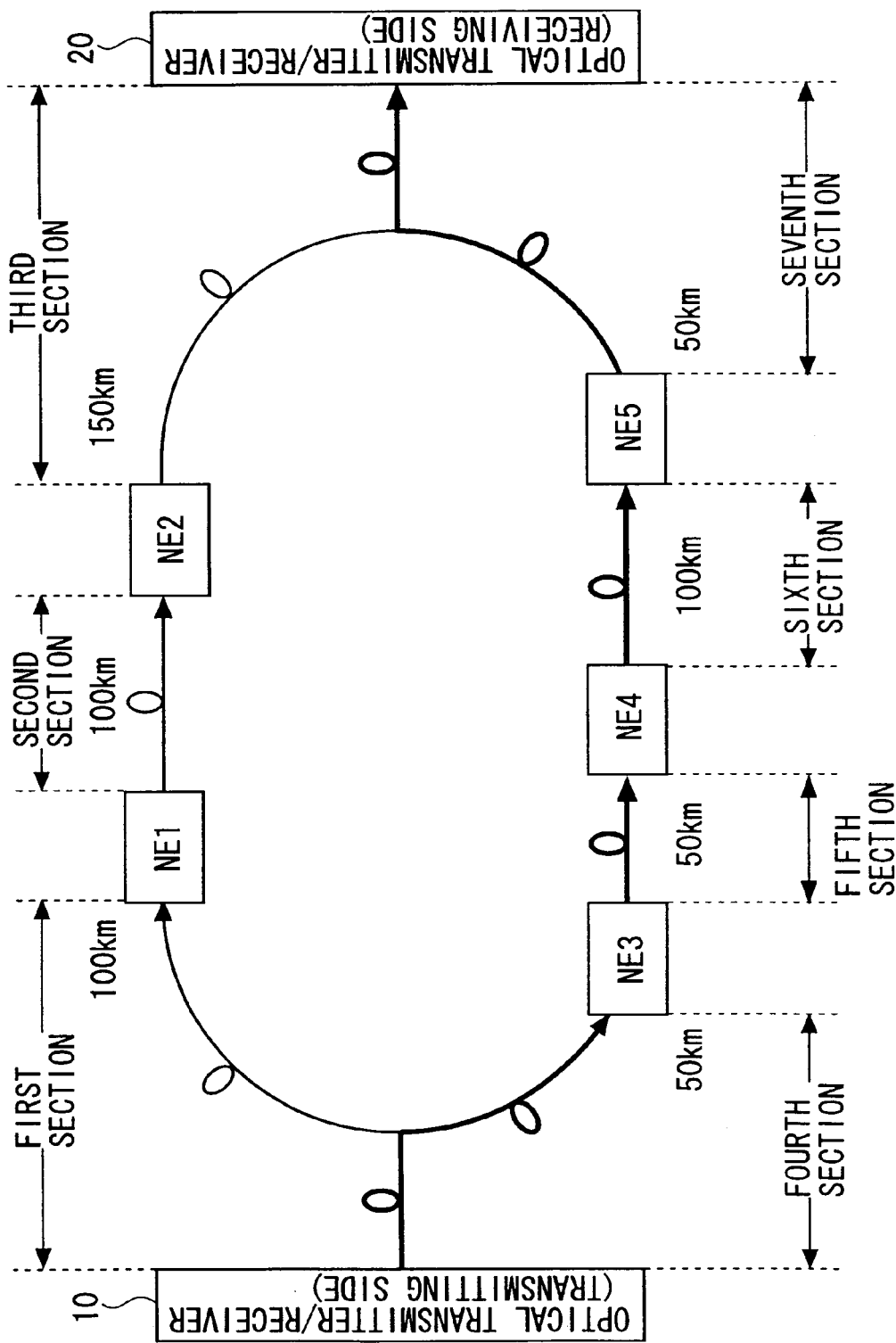
FIG. 11 is an operation explanation diagram of the third transmission route determination method.

FIG. 11 is an operation explanation diagram of the third transmission route determination method. In the example shown in FIG. 11, the transmission distance of the first section constituting the first transmitting route is 100 km, the transmission distance of the second section is 100 km, and the transmission distance of the third section is 150 km. On the other hand, the transmission distance of the fourth section constituting the second transmitting route is 50 km, the transmission distance of the fifth section is 50 km, the transmission distance of the sixth section is 100 km, and the transmission distance of the seventh section is 50 km. In this case, the total transmission distance of the first transmitting route is 350 km, and the total transmission distance of the second transmitting route is 250 km. Thus, the second transmitting route is determined as the route applied to the line (between the optical transmitter/receivers 10 and 20) of the addition target.

In the route determination, if there are a plurality of smallest total transmission distances, one transmission route is selected based on a predetermined priority order.

It can be configured such that the optical transmitter/receiver 20 has the configuration as the inquiry source as shown in FIG. 9, the optical transmitter/receiver 10 has the configuration as the inquiry destination as shown in FIG. 10, and the transmission route to the optical transmitter/receiver 10 from the optical transmitter/receiver 20 is determined.

Also, in the above-mentioned example, the example case where the transmission route is determined by the optical transmitter/receiver 10 is explained. In contrast, the network controller 30 can be configured to inquire the transmission distance to the NE (including the optical transmitter/receiver) on each transmission route and determine the transmission route. Also, the functions possessed by the inquiry source as mentioned above can be attained by the cooperation between the optical transmitter/receiver on the transmitting side and the network controller.

<Used Wavelength Determination Method for Each Section of Line>

The embodiment of the used wavelength determination method for each section of the line according to the present invention will be described below. In the present invention, in a case of adding a new line through one or more repeaters (NEs) between an optical transmitter (a start point of the transmission route) and an optical receiver (an end point of the transmission route), the wavelength component of the WDM optical signal to be applied to this line is determined for each section on the transmission route.

To be specific, in each section from the start point of the transmission route to the end point, the wavelength component is determined by selecting the wavelength when a transmission property of the optical signal transmitted through the section becomes the best status, from the unused wavelengths. As the transmission property, the following items can be exemplified.

<1> Optical Signal to Noise Ratio (OSNR)
  <First Used Wavelength Determination Method>
<2> Light Reception Power
  <Second Used Wavelength Determination Method>
<3> Gain Tilt <Third Used Wavelength Determination Method>

The first to third transmission route determination methods will be described below.

<<First Used Wavelength Determination Method>>

As the first used wavelength determination method, a method which selects, from the unused (not-in-use) wavelengths (wavelength components) in each section of the transmission route, one of the wavelengths having the best OSNR characteristics of optical signal in the section, and consequently determines the wavelength to be applied to the target line to be added.

Figure 12:
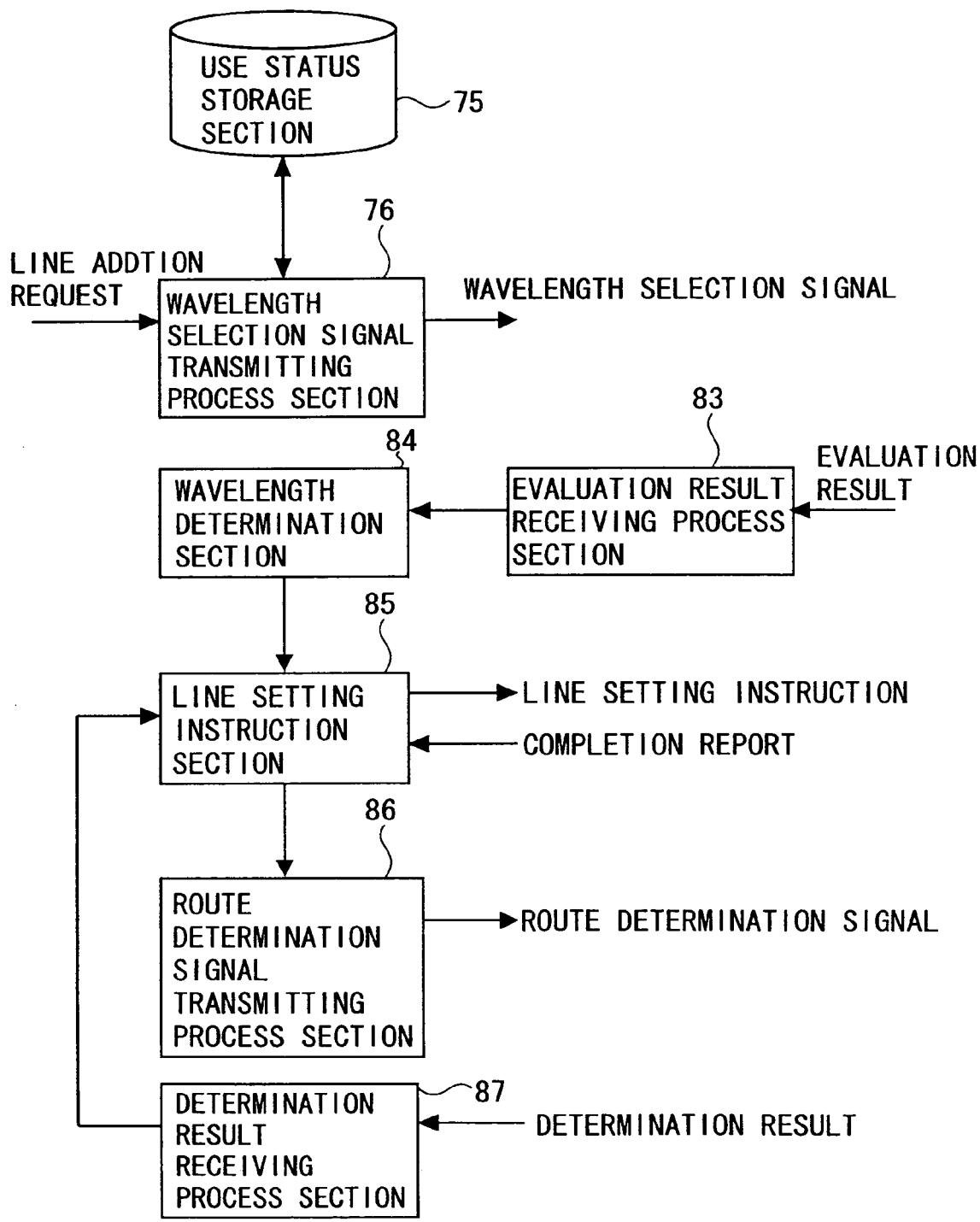
FIG. 12 is a block diagram showing main functions provided to the optical transmitter on the transmission route in order to attain a method of determining a wavelength used on a line (a wavelength determination method)
Figure 13:
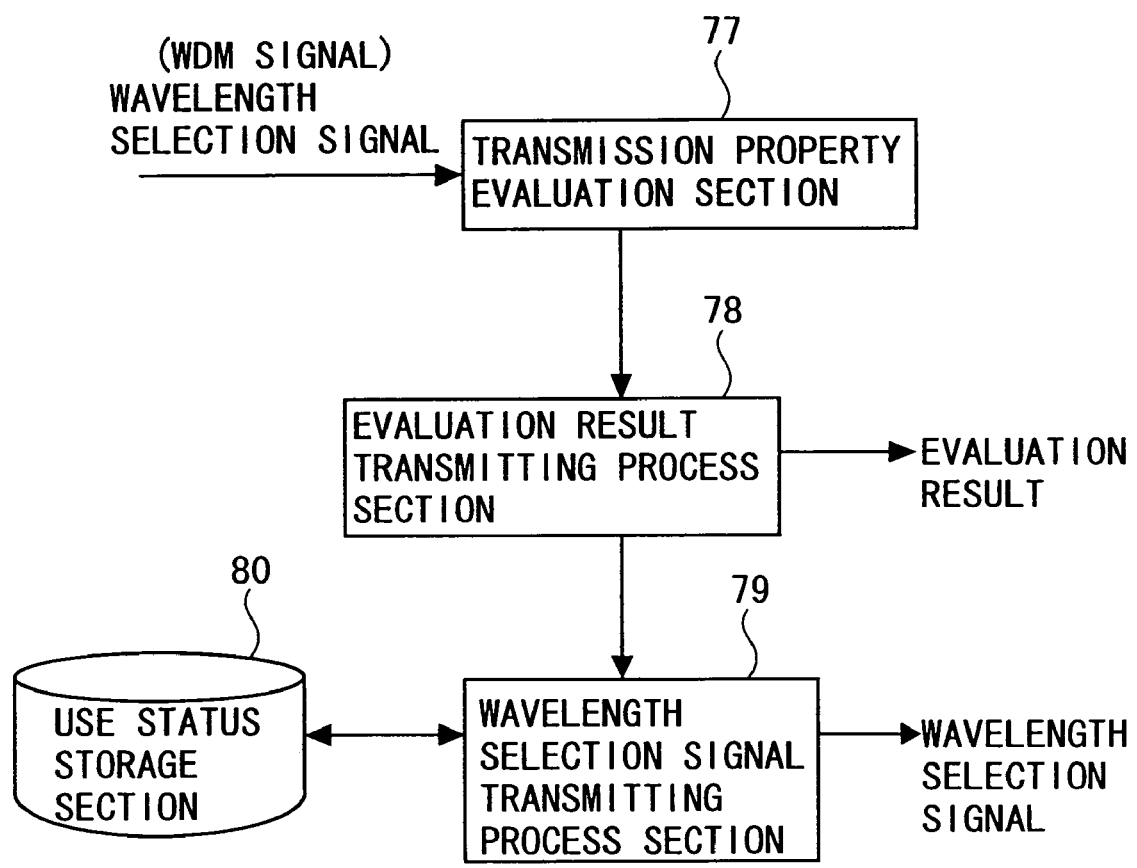
FIG. 13 is a block diagram showing functions provided to respective NEs on the transmission route in order to attain the wavelength determination method.
Figure 14:
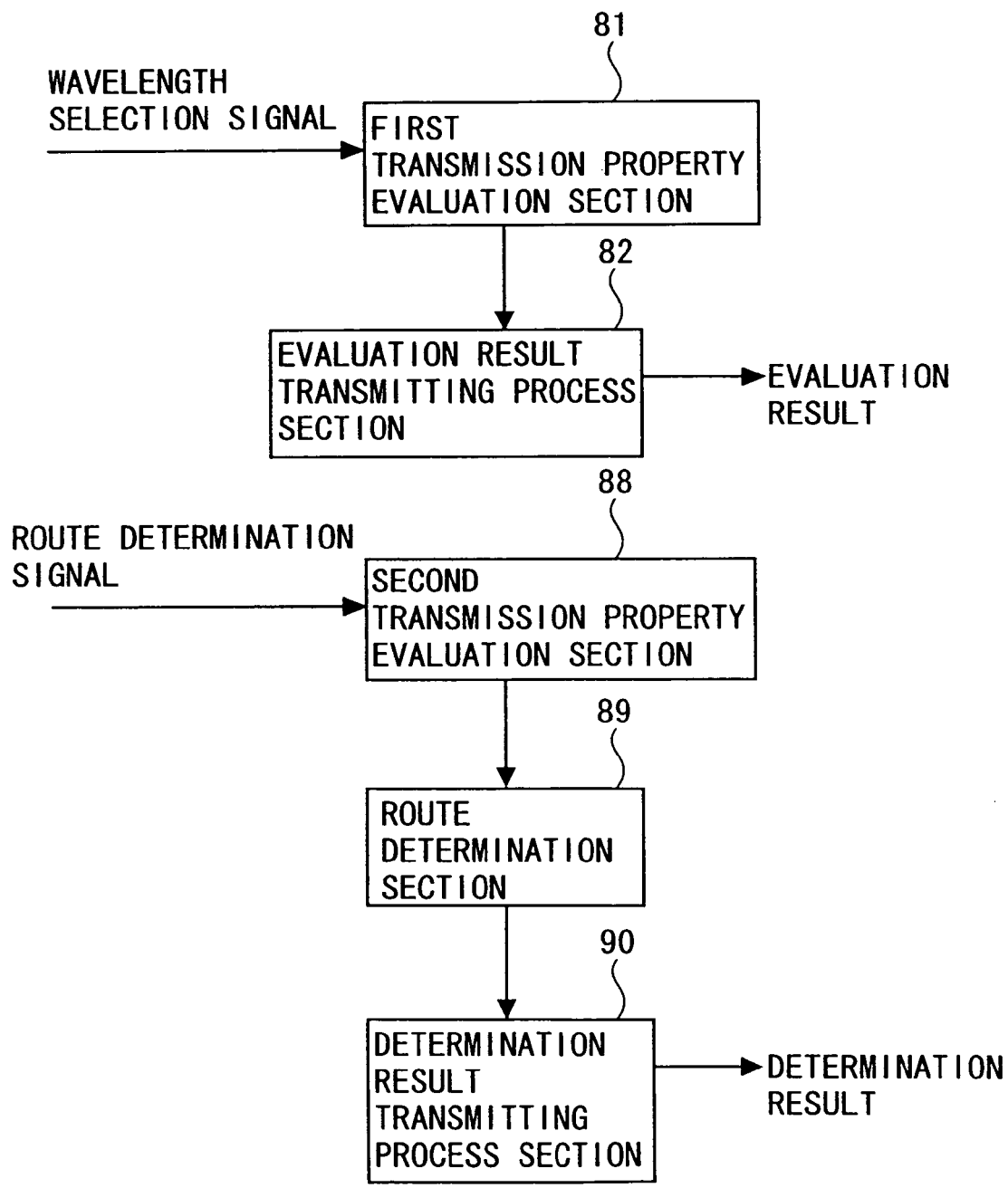
FIG. 14 is a block diagram showing main functions provided to the optical receiver on the transmission route in order to attain the wavelength determination method.

In order to attain the first used wavelength determination method, for example, the optical transmitter/receiver 10 has the configuration as shown in FIG. 12, the respective NEs 1 to 5 have the configuration as shown in FIG. 13, and the optical transmitter/receiver 20 has the configuration as shown in FIG. 14. FIG. 12 is a block diagram showing the functions provided to the optical transmitter (the optical transmitter/receiver 10 on the transmitting side), FIG. 13 is a block diagram showing the functions provided to the respective NEs, and FIG. 14 is a block diagram showing the functions provided to the optical receiver (the optical transmitter/receiver 20 on the receiving side).

As shown in FIG. 12, the optical transmitter/receiver 10 has a use status storage section 75 and a wavelength selection signal transmitting process section 76. The use status storage section 75 stores information indicating the use statuses (in-use/unused (not-in-use)) of the respective wavelength components ($\lambda(1)$ to $\lambda(n)$) applied to the WDM optical signal.

The wavelength selection signal transmitting process section 76 is started by, for example, the line addition request inputted in a case of adding a line through which information is to be transmitted from the optical transmitter/receiver 10 to the optical transmitter/receiver 20.

The wavelength selection signal transmitting process section 76 refers to the use status storage section 75 to specify the unused wavelength components in the section between the self-device (optical transmitter/receiver 10) and the NE just behind on the transmission route for which the target line to be added is scheduled to be set, and executes a transmitting process of an evaluation signal (referred to as "wavelength selection signal") of the wavelength components. The wavelength selection signal transmitting process section 76 generates the wavelength selection signals having different wavelengths with regard to every unused wavelength components respectively, and sequentially transmits the generated signals.

Accordingly, the optical signal corresponding to each of the unused wavelength components is inputted to the optical cross-connect switch 11, multiplexed with the other wavelength components by the MUX, sent the multiple optical signal (WDM optical signal) to an optical fiber through the transmitting amplifier and the optical fiber coupler. The multiple optical signal is transmitted to the NE located just behind the optical transmitter/receiver 10 through the optical fiber.

As shown in FIG. 13, each of the NEs 1 to 5 includes a transmission property evaluation section 77, an evaluation result transmitting process section 78, a wavelength selection signal transmitting process section 79 and a use status storage section 80.

In the respective NEs 1 to 5, the WDM optical signal (each wavelength component included therein) including the wavelength selection signal from the optical transmitter/receiver 10 or NE is inputted to the transmission property evaluation section 77 through the optical fiber coupler for demultiplexing, the receiving OSC unit, and the switch 28 of the optical cross-connect switch 21.

The transmission property evaluation section 77 measures the optical signal to noise ratio (OSNR) of each wavelength selection signal as the transmission property of the optical signal of the corresponding section and passes the measure result of the OSNR as an evaluation result to the evaluation result transmitting process section 78. At this time, the transmission property of only the wavelength selection signal may be defined as the evaluation target, or the transmission property of the respective wavelength components included in the WDM optical signals of the section including the wavelength components of the wavelength selection signal may be defined as the target of the entire evaluation. The transmission property evaluation section 77 measures and evaluates the transmission property of the optical signal of the section including the wavelength selection signals having different wavelengths and being sequentially sent from the transmitting side, while a predetermined range is assumed to be the evaluation target.

The evaluation result transmitting process section 78 executes a process for transmitting information indicative of the evaluation result of the transmission property to the optical transmitter/receiver 10. The information indicative of the evaluation result, for example, can be included into the OSC optical signal and transferred to the optical transmitter/receiver 10.

The wavelength selection signal transmitting process section 79 specifies the unused wavelength components in the next section (the section between the self-device and the next NE) on the transmission route, based on the use status (in-use/unused (not-in-use)) of each wavelength component stored in the use status storage section 80, and outputs the optical signal (the wavelength selection signal) of the unused wavelength component for each of the unused wavelength components.

Accordingly, the WDM optical signal with which the wavelength selection signal is multiplexed is sent from the optical cross-connect switch 21 to the optical fiber through the transmitting amplifier 22. The WDM optical signal is transmitted to the next NE or optical transmitter/receiver 20 via the optical fiber. As shown in FIG. 14, the optical transmitter/receiver 20 includes a first transmission property evaluation section 81 and an evaluation result transmitting process section 82, which are similar to the transmission property evaluation section 77 and the evaluation result transmitting process section 78 that are provided to the respective NEs.

With the above-mentioned configurations, between the transmitting side and receiving side of each section on the transmission route for which the target line to be added can be set, the optical signal of the unused wavelength component in the section is transmitted and received for each of the unused wavelength components as the wavelength selection signal. Then, the receiving side evaluates the transmission properties of the wavelength components of the wavelength selection signal, or the respective wavelength components of the section including the wavelength component of the wavelength selection signal, respectively, and the evaluation result is given to the optical transmitter/receiver 10.

The optical transmitter/receiver 10 includes, as shown in FIG. 12, an evaluation result receiving process section 83 for receiving the evaluation result for each of the unused wavelength components in each section; and a wavelength determination section 84 for receiving the evaluation result from the evaluation result receiving process section 83 to determine the wavelength component whose evaluation result is the best condition, as the wavelength component to be used in the section. In the first wavelength selection method, the wavelength determination section 84 selects the wavelength component whose OSNR property is the best condition, from the unused wavelength components in each section.

However, in a certain section, if the substantially same transmission property is obtained with regard to the plurality of wavelength components, it is configured, for example, so as to select the same wavelength component selected in the other section as much as possible. Also, in each section, it can be configured to select the same wavelength component as much as possible. Alternatively, it can be configured to select the wavelength component in each section so that the wavelength component from the start point of the transmission route to the end point does not be changed as much as possible.

In the above-mentioned method, the wavelength selection signals having different wavelength components are sequentially transmitted and received between the transmitting side and receiving side of each section. In this case, it can be configured such that the transmitting side and the receiving side transmit and receive the wavelength selection signals synchronously in accordance with a preset transmitting/receiving timing. Alternatively, it can be configured such that the transmitting side transmits the next wavelength selection signal after receiving a transmitting allowance for the next wavelength selection signal from the receiving side.

In the present invention, if there are the plurality of transmission routes (the first and second transmitting routes in the examples shown in FIG. 1, FIG. 2A, and FIG. 2B) for which the target line to be added can be set between the optical transmitter and the optical receiver, the following configuration can be applied.

That is, the wavelength of each section is determined for each transmission route. Next, the test lines for each transmission route with the determined wavelength component are respectively set between the start point (the optical transmitter/receiver 10) of the transmission route and the end point (the optical transmitter/receiver 20). Next, the signal (a route determination signal) is transmitted through the test lines between the start point and the end point. Next, the transmission properties (here, OSNR) of the respective wavelength components included in the WDM optical signals including the wavelength component of the route determination signal or the wavelength components of the route determination signal that is received from the respective routes at the end point are evaluated, and the transmission route with the best transmission property is determined as the transmission route to be applied to the target line to be added, and this determination result is reported to the start point. Then, at the start point, the adding process of the line is carried out in accordance with the determination result.

For this reason, as shown in FIG. 12, the optical transmitter/receiver 10 (the start point of the transmission route) includes a line setting instruction section 85, a route determination signal transmitting process section 86, and a determination result receiving process section 87. Also, as shown in FIG. 14, the optical transmitter/receiver 20 (the end point of the transmission route) includes a second transmission property evaluation section 88, a route determination section 89, and a determination result transmitting process section 90.

In FIG. 12, the line setting instruction section 85 is configured to receive the determination result of the wavelength component to be used in each section, for each transmission route, from the route determination section 74. The line setting instruction section 85 gives the setting instruction for the test line, to the respective NEs and optical transmitter/receiver 20 on the transmission route. Accordingly, the test line to transmit the optical signal of the wavelength component determined in each section is set on the transmission route.

The line setting instruction section 85, when receiving a completion report of the test line setting with regard to the setting instruction, gives a transmission instruction to transmit the route determination signal to the route determination signal transmitting process section 86. The route determination signal transmitting process section 86, when receiving the transmission instruction, outputs the optical signals of the respectively determined wavelength components, as the route determination signals, to the initial (first) sections of the respective transmission routes (for example, the first section in the first transmitting route and the fourth section in the second transmitting route).

The route determination signal is sent from the optical cross-connect switch 11 to the respective transmission routes (the first and second transmitting routes). The NE that has received the route determination signal, if the wavelength used in the next section differs from the wavelength of the previous section, for example, once converts the route determination signal into an electric signal, and again converts the electric signal into the optical signal of the wavelength used in the next section, and then transfers to the receiving side of the next section.

In this way, the route determination signal passes through the respective transmission routes and finally arrives at the optical transmitter/receiver 20, and is inputted to the second transmission property evaluation section 88 shown in FIG. 14. The second transmission property evaluation section 88 measures and evaluates the wavelength component of the route determination signal, or each wavelength component (here, OSNR) of the received WDM optical signal including the wavelength component of the route determination signal, for each transmission route. Then, the evaluation result with regard to each transmission route is passed to the route determination section 89.

The route determination section 89 receives the evaluation result for each transmission route from the second transmission property evaluation section 88 and determines the transmission route having the best transmission property (OSNR), as the transmission route to be applied to the target line to be added. The determination result transmitting process section 90 receives the determination result of the transmission route from the route determination section 89 and reports the determination result to the optical transmitter/receiver 10.

The determination result receiving process section 87 shown in FIG. 12, when receiving the determination result from the optical transmitter/receiver 20, passes this determination result to the line setting instruction section 85. The line setting instruction section 85 creates line setting instructions necessary for applying the transmission route specified in accordance with the determination result to the target line to be added to give to the respective NEs and optical transmitter/receiver 20 on the transmission route. In this way, the new line is added between the optical transmitter/receivers 10 and 20.

Figure 22:
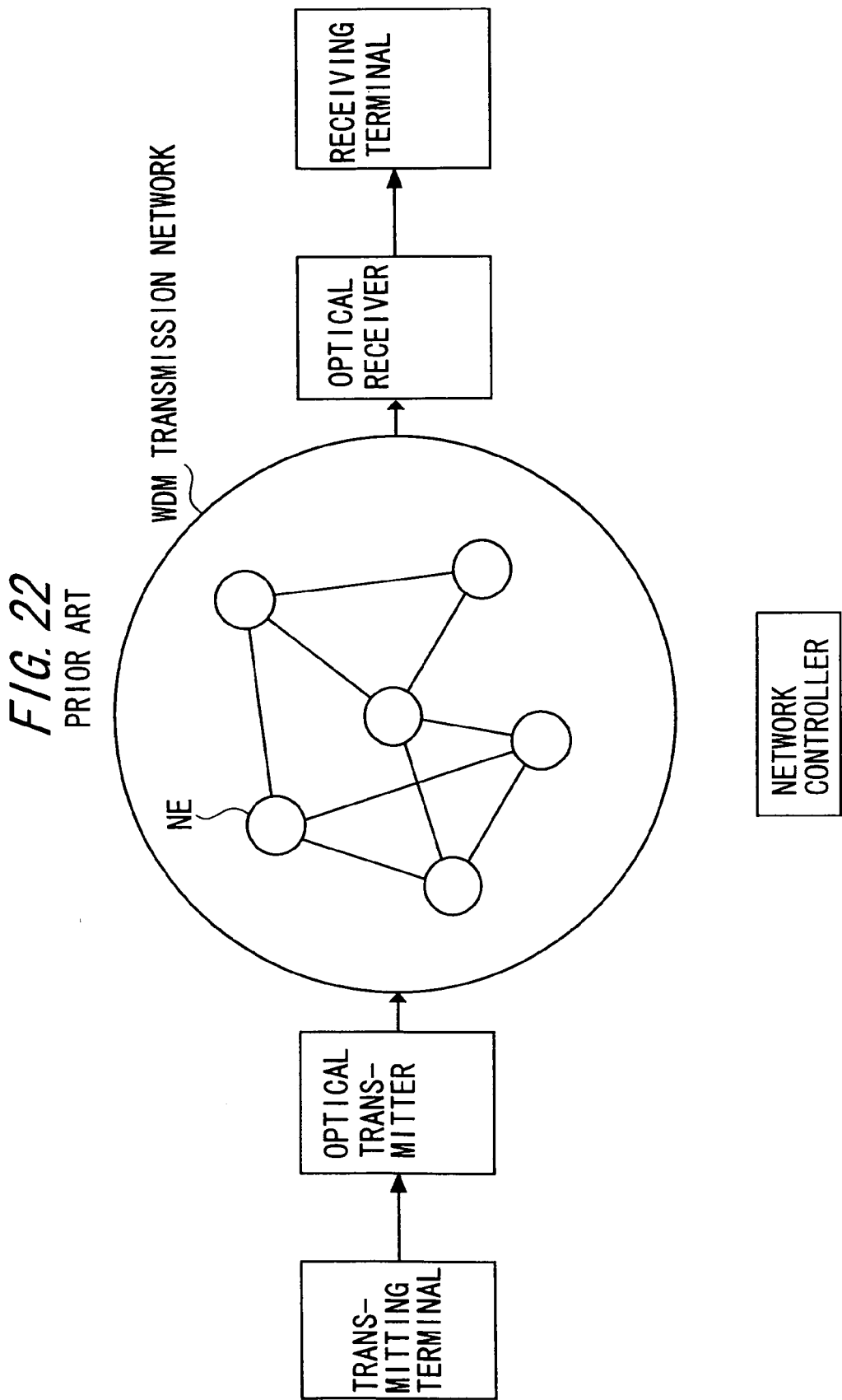
FIG. 22 is an explanation diagram of an optical multiplexing transmission system.

The added line is used in a network configuration as shown in FIG. 22, for example, in a case where the information transmitted and received between a transmitting terminal and a receiving terminal is transmitted through between the optical transmitter (the optical transmitter/receiver 10) and the optical receiver (the optical transmitter/receiver 20).

Figure 15:
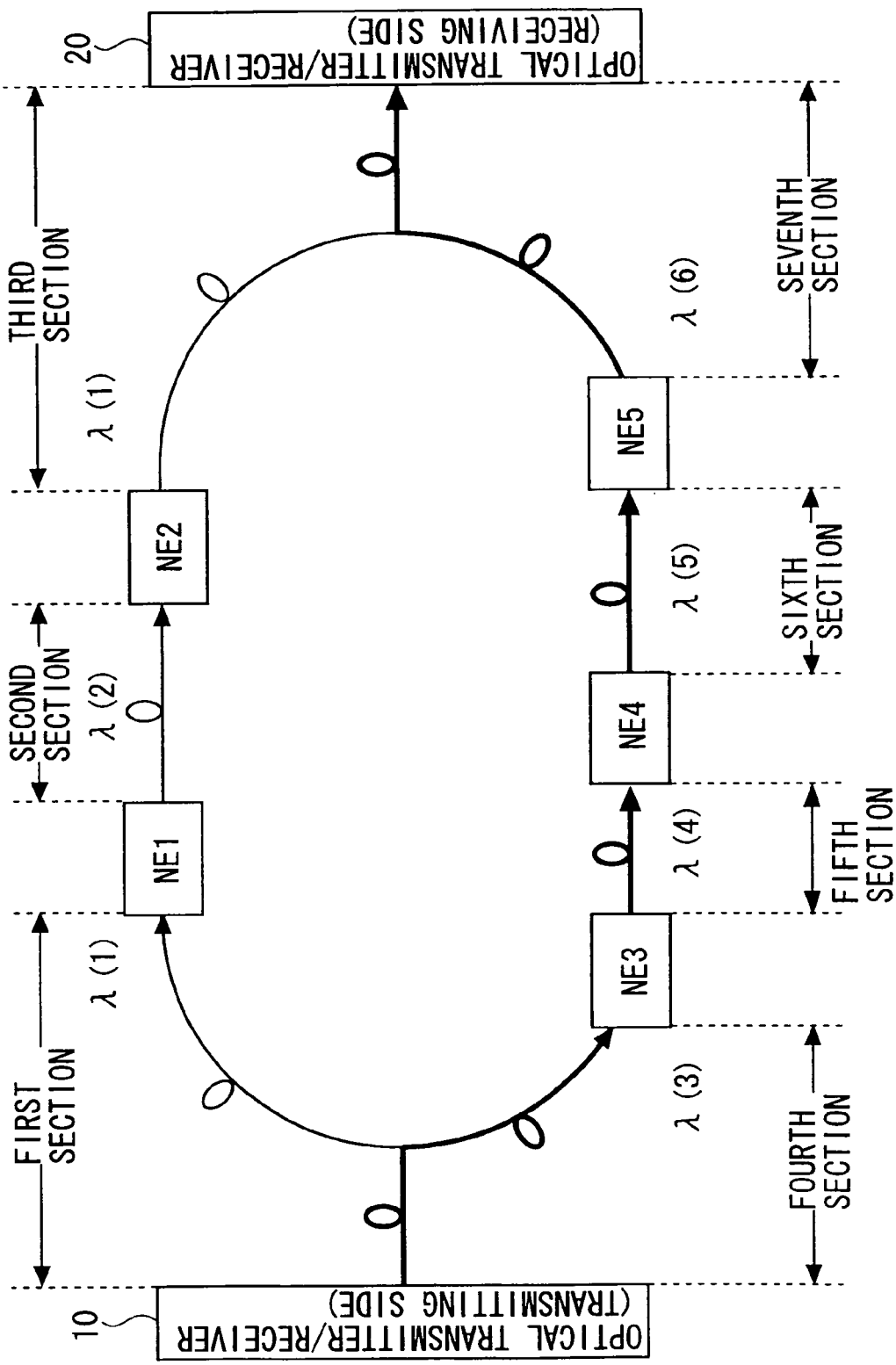
FIG. 15 is an operation explanation diagram of the wavelength determination method.

FIG. 15 is an operation explanation diagram of the wavelength determination method based on the transmission property of the optical signal in each section and the route determination method based on the wavelength determination method. FIG. 15 exemplifies the wavelengths having the best OSNR properties in the respective sections (the first to seventh sections), respectively. In this example, a wavelength λ(1) is selected for the first section, a wavelength λ(2) is selected for the second section, and a wavelength λ(1) is selected for the third section. Also, a wavelength λ(3) is selected for the fourth section, a wavelength λ(4) is selected for the fifth section, a wavelength λ(5) is selected for the sixth section, and a wavelength λ(6) is selected for the seventh section.

Then, through the test line set in accordance with the selection result of the wavelength as mentioned above, the route determination signal is transmitted through each of the first and second transmitting routes from the optical transmitter/receiver 10 to the optical transmitter/receiver 20. The optical transmitter/receiver 20 compares the OSNR properties related to the route determination signals between the first and second transmitting routes, and determines one of the first and second transmitting routes that the OSNR properties is better, to report the result to the optical transmitter/receiver 10. The optical transmitter/receiver 10 applies the determined transmission route (one of the first and second transmitting routes), which is reported to be better, to the target line to be added.

<<Second Used Wavelength Determination Method>>

As the second used wavelength determination method, a method which selects, from the unused wavelength component in each section of the transmission route, the wavelength component having the light receiving power of the best condition in the section, and consequently determines the wavelength component to be applied to the target line to be added.

In order to attain the second used wavelength determination method, similarly to the first used wavelength determination method, for example, the optical transmitter/receiver 10 can have the configuration as shown in FIG. 12, the respective NEs 1 to 5 can have the configuration as shown in FIG. 13, and the optical transmitter/receiver 20 can have the configuration as shown in FIG. 14.

However, each of the transmission property evaluation section 77 (FIG. 13) and the first transmission property evaluation section 81 (FIG. 14) measures its light receiving power as the transmission property related to the wavelength selection signal (the unused wavelength component) and passes its result as the evaluation result to the evaluation result transmitting process section 78 (82). At this time, the light receiving power of only the wavelength selection signal may be used as the evaluation target, or each light receiving power of each wavelength component used in the section including the wavelength component of the wavelength selection signal may be used as the target of the entire evaluation. The transmission property evaluation section 77 measures and evaluates the transmission properties related to the unused respective wavelength components sequentially sent from the transmitting side, while the predetermined range is assumed to be the evaluation target.

In this way, in the second used wavelength determination method, except that the targeted transmission property is the light receiving power, the configuration to attain the method itself and its method is substantially similar to the first used wavelength determination method (refer to FIG. 12 to FIG. 15).

<<Third Used Wavelength Determination Method>>

As the second used wavelength determination method, it is explained a method which selects, from the unused wavelength component in each section of the transmission route, the wavelength component having a gain tilt of the best condition in the section, and consequently determines the wavelength component to be applied to the target line to be added.

In order to attain the third used wavelength determination method, similarly to the first used wavelength determination method, for example, the optical transmitter/receiver 10 can have the configuration as shown in FIG. 12, the respective NEs 1 to 5 can have the configuration as shown in FIG. 13, and the optical transmitter/receiver 20 can have the configuration as shown in FIG. 14.

However, each of the transmission property evaluation section 77 (FIG. 13) and the first transmission property evaluation section 81 (FIG. 14) measures the gain tilt, as the transmission property related to the wavelength selection signal (the unused wavelength component). The gain tilt indicates a tilt of the power when the power of light is arrayed for each wavelength. The transmission property evaluation section 77 and the first transmission property evaluation section 81 includes spectrum analyzers for measuring each light receiving power of each wavelength component that have been in-use (transmitted and received) in the section and the wavelength component of the wavelength selection signal. The transmission property evaluation section 77 (81) measures the gain tilt on the basis of the measurement result of the spectrum analyzer. The transmission property evaluation section 77 (81) measures and evaluates the transmission properties (the gain tilts) related to the unused respective wavelength components sequentially sent from the transmitting side. Then, it is configured such that the wavelength of the wavelength selection signal when the gain tilt flattens most is selected from the unused wavelength in the section.

In this way, in the third used wavelength determination method, except that the targeted transmission property is the gain tilt, the configuration to attain the method itself and its method is substantially similar to the first used wavelength determination method (refer to FIG. 12 to FIG. 15).

<Correction Method of Transmission Property of Optical Signal of Additional Line>

The embodiment of the correction method of the transmission property of the optical signal of the additional line according to the present invention will be described below. As mentioned above, when the new line is added between the optical transmitter and the optical receiver, the optimal wavelength is specified from the unused wavelengths in each section on the transmission route, and this optimal wavelength is used to set the line. After that, if the addition of the line results in the deterioration in the transmission property of the optical signal of the other lines (the wavelength components), the correction or adjustment of the transmission property is carried out so as to eliminate the deterioration.

Figure 16:
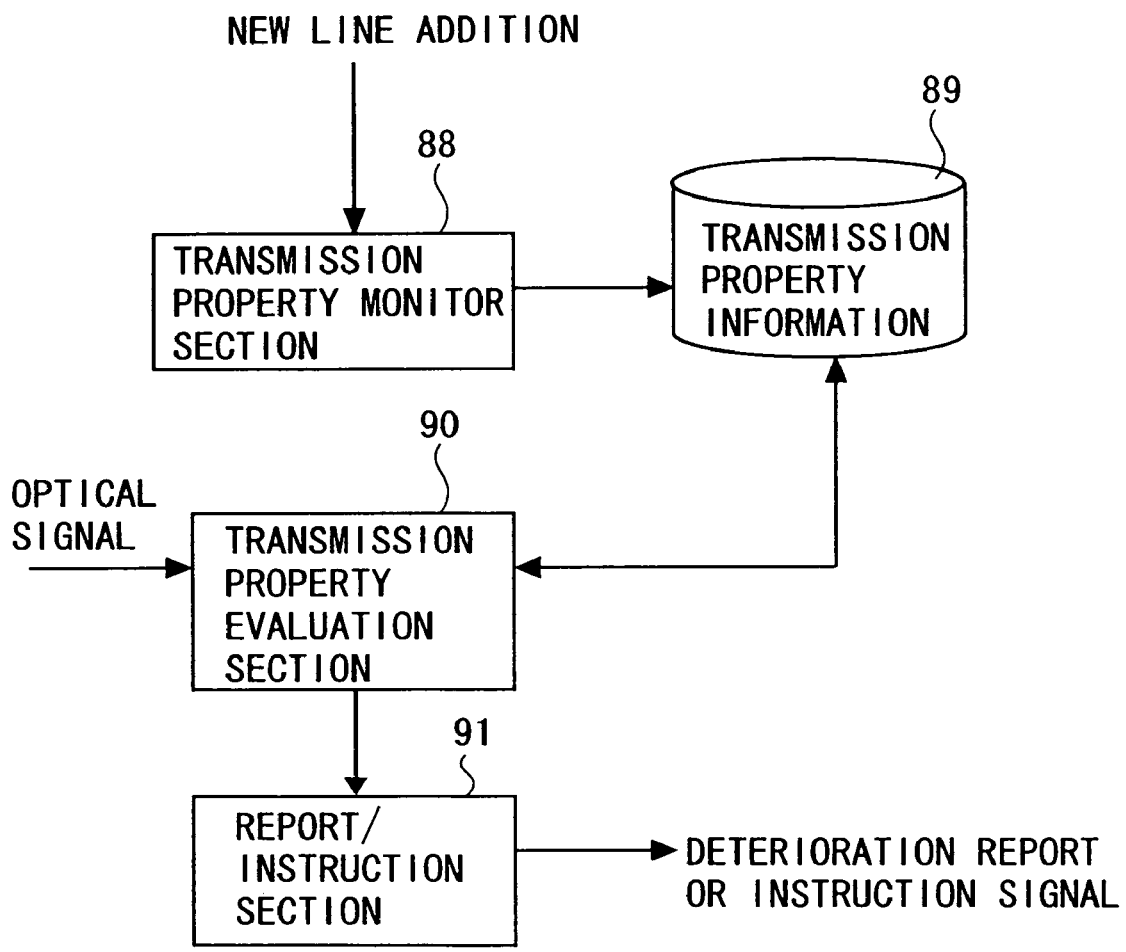
FIG. 16 is a block diagram showing main functions provided to the optical receiver on the transmission route in order to attain a transmission-property correction method.

For this reason, the optical receiver (for example, the optical transmitter/receiver 20) can include the configuration as shown in FIG. 16. FIG. 16 is a block diagram showing the functions possessed by the optical receiver. The optical receiver can include a transmission property monitor section 88, a transmission property information storage section 89, a transmission property evaluation section 90, and a report/instruction section 91.

The transmission property monitor section 88 monitors a particular transmission property of the optical signal. Examples of the transmission property may include at least one of the OSNR, the light receiving power, and the gain tilt. The second transmission property evaluation section 88 stores information indicating the transmission property immediately before the addition in the transmission property information storage section 89, when one line is newly added between the optical transmitter and the optical receiver. The transmission property monitor section 88 can executing a storing operation of the information as described above, because it is configured to receive the information or signal indicating that the adding operation of the line is carried out in the optical receiver when the operation is carried out.

Figure 17:
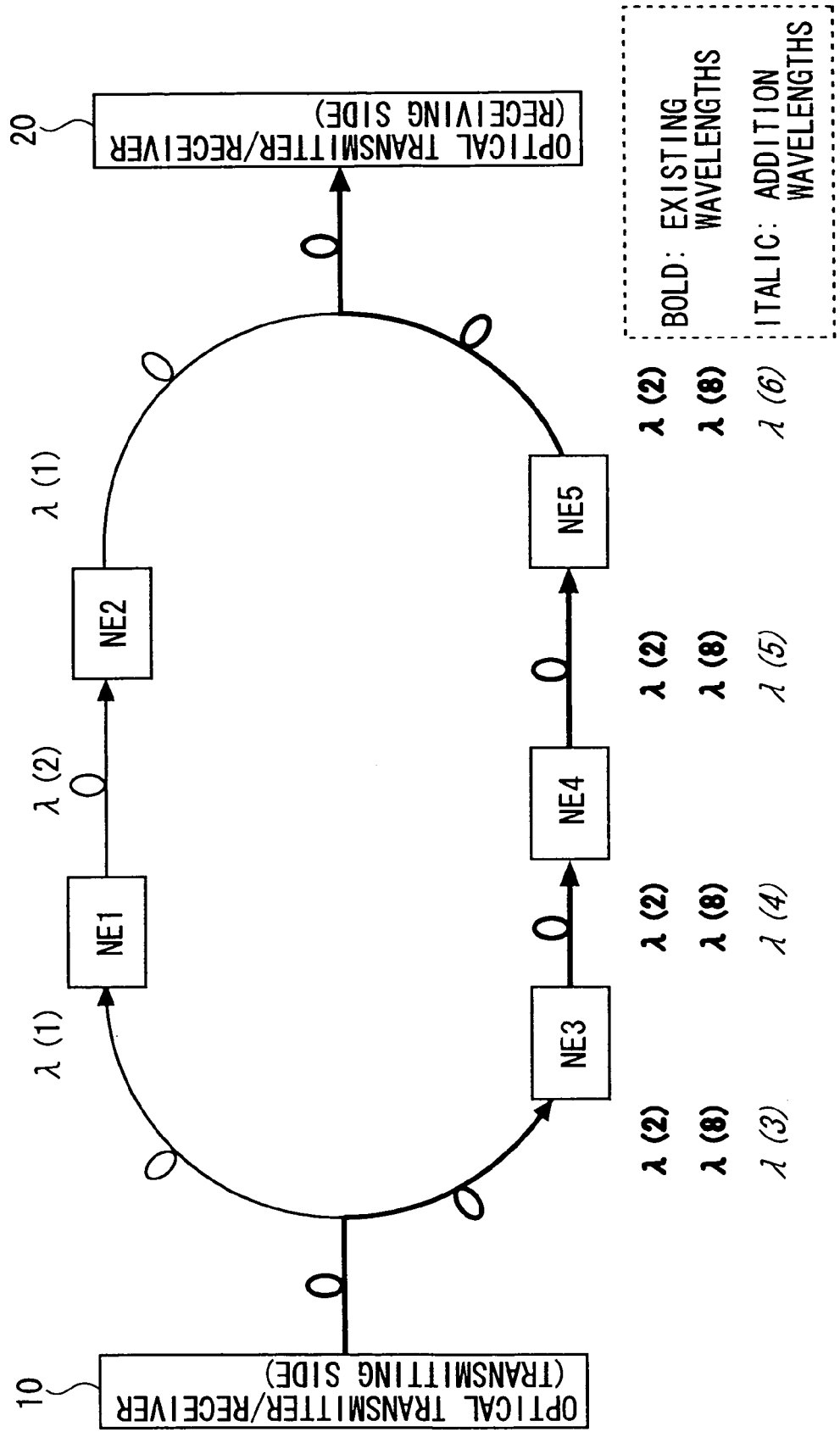
FIG. 17 is an explanation diagram of the transmission-property correction method.

Supposing a case where the line is added between the optical transmitter and the optical receiver as shown in FIG. 17 by the adding operation of the new line as mentioned above. FIG. 17 shows a condition where one line is added, in the case where two lines are already set on the first transmission route between the optical transmitter (the optical transmitter/receiver 10) and the optical receiver (the optical transmitter/receiver 20).

In FIG. 17, a first existing line where the wavelength of $\lambda(2)$ is used in each of the fourth to seventh sections on the first transmission route and a second existing line where the wavelength of $\lambda(8)$ is used in each of the fourth to seventh sections are set. In this case, it is assumed that the setting method of the line according to the present invention as mentioned above is used to add the line (referred to as "new line") where $\lambda(3)$, $\lambda(4)$, $\lambda(5)$ and $\lambda(6)$ are respectively used in each of the fourth to seventh sections.

In this case, the optical transmitter/receiver 20 receives the optical signals of the respective wavelengths of $\lambda(2)$ and $\lambda(8)$ related to the first and second existing lines from the second transmission route, prior to the addition of the new line. Then, prior to the addition of the new line (for example, immediately before), the transmission property monitor section 88 stores the information indicating the transmission properties of the optical signals of $\lambda(2)$ and $\lambda(8)$ in the transmission property information storage section 89.

After that, when the new line is added, the optical transmitter/receiver 20 becomes in a condition where together with the optical signals of $\lambda(2)$ and $\lambda(8)$, the optical signal of $\lambda(6)$ related to the new line is received, together with the optical signals of $\lambda(2)$ and $\lambda(8)$. The transmission property comparison section 90 shown in FIG. 16 measures the transmission property the addition of the new line has been added, compares the transmission property with the information (the transmission property prior to the new line addition) stored in the transmission property information storage section 89, and judges whether the transmission property is deteriorated by the addition of the new line, and if it is deteriorated, reports the deterioration in the transmission property to the report/instruction section 91.

The report/instruction section 91 reports an adjustment instruction for the deterioration in the transmission property to the optical transmitter (the optical transmitter/receiver 10). The optical transmitter/receiver 10, when receiving the report, gives the instruction to eliminate the deterioration in the transmission property to each NE on the transmission route.

Alternatively, the report/instruction section 91 can be configured to output a signal (instruction signal) related to an instruction to eliminate the deterioration in the transmission property. In this case, the instruction signal is given to the inner circuit of the optical transmitter/receiver 20 corresponding to its destination. Alternatively, the instruction signal is given as the OSC signal to the optical transmitter/receiver 10 and/or the NE on the transmission route. In the receiving destination of the instruction signal, the operation for correcting the transmission property is executed.

The transmission property evaluation section 90 and the report/instruction section 91 constitute a part of a feedback loop and repeat the operation for the comparison and evaluation as mentioned above and the output operation for the report signal or instruction signal, until the deterioration in the transmission property after the addition of the new line is judged to have been eliminated.

For example, in a case where the transmission property of the evaluation target is the OSNR and the transmission property evaluation section 90 admits the deterioration in the OSNR because of the addition of the new line, the report section 91 gives the report of the deterioration to the optical transmitter/receiver 10. Then, the optical transmitter/receiver 10 gives instructions for solving the deterioration in the OSNR to at least one NE and corrects the OSNR. The correction for the OSNR is carried out by adjusting the power of the light of the particular wavelength related to the deterioration in the OSNR, or adjusting the gain of the optical transmitter or receiving amplifier of the WDM optical signal.

Alternatively, inside the optical transmitter/receiver 20, the power of the light of the wavelength where the OSNR is deteriorated is adjusted, and/or the light receiving amplifier (R-11) adjusts the gains of all of the wavelengths ($\lambda(2)$, $\lambda(8)$ and $\lambda(6)$) on the transmission route. Accordingly, the OSNR property is corrected (adjusted).

Alternatively, it can be configured such that the instruction signal (the OSC signal) of the correction for the OSNR is fed back to the NE 5, and in the NE 5, the power adjustment of the wavelength where the OSNR is deteriorated and/or the adjustment of all the wavelengths ($\lambda(2)$, $\lambda(8)$ and $\lambda(6)$) (the adjustment of the transmitting signal to the optical transmitter/receiver 20) are executed. At this time, as long as the deterioration in the OSNR can be corrected, the feedback destination may be the optical transmitter/receiver 10 and the NE except the NE 5 on the transmission route (the second transmitting route).

Figure 18:
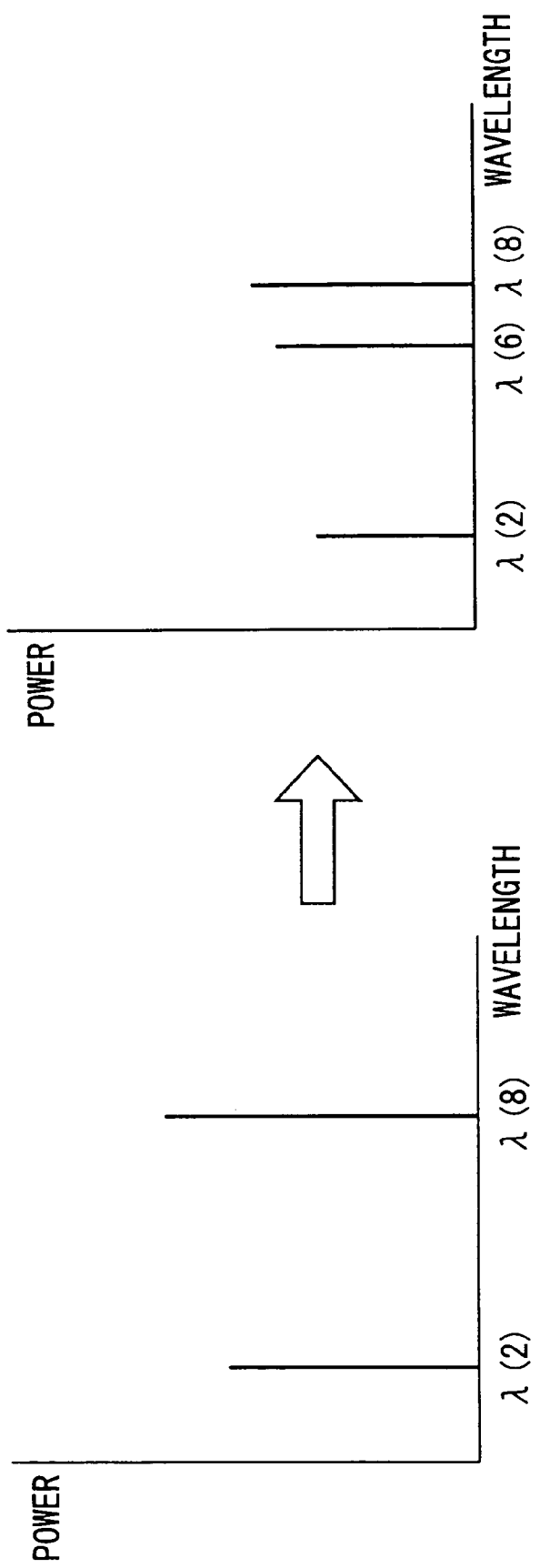
FIG. 18 is a diagram showing an example of deterioration (degradation) in a light reception power caused by an addition of a new line.
Figure 19:
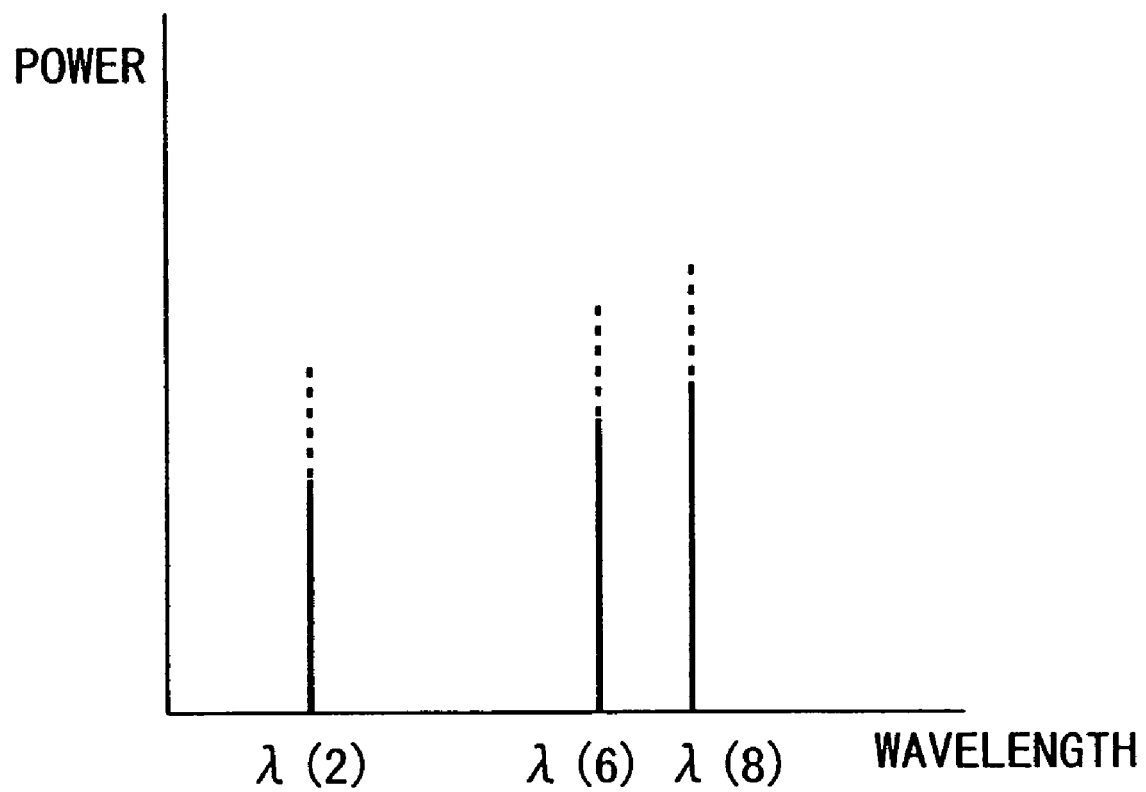
FIG. 19 is a diagram showing an example of an improvement due to an adjustment of the light reception power.

Also, when the transmission property of the evaluation target is the light receiving power, as shown in FIG. 18, there may be a case that the addition of the wavelength ($\lambda(6)$) of the new line leads to reduction in the light receiving powers of the respective wavelengths ($\lambda(2)$ and $\lambda(8)$) of the first and second existing lines. In this case, the transmission property evaluation section 90 and the report/instruction section 91 report the deterioration in the light receiving power to the optical transmitter/receiver 10 or transmit the instruction signal to a predetermined destination so that the light receiving power of each wavelength has an optimal value (best condition) as shown in FIG. 19.

Figure 20:
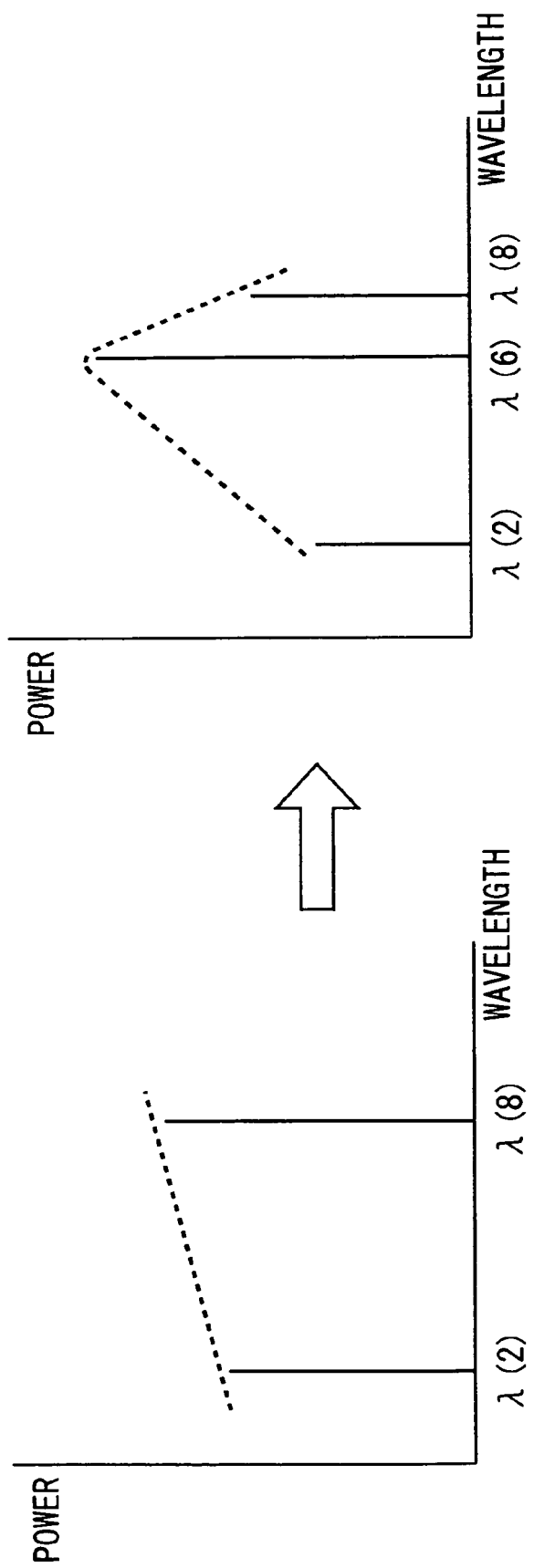
FIG. 20 is a diagram showing an example of deterioration (degradation) in a gain tilt caused by the addition of the new line.
Figure 21:
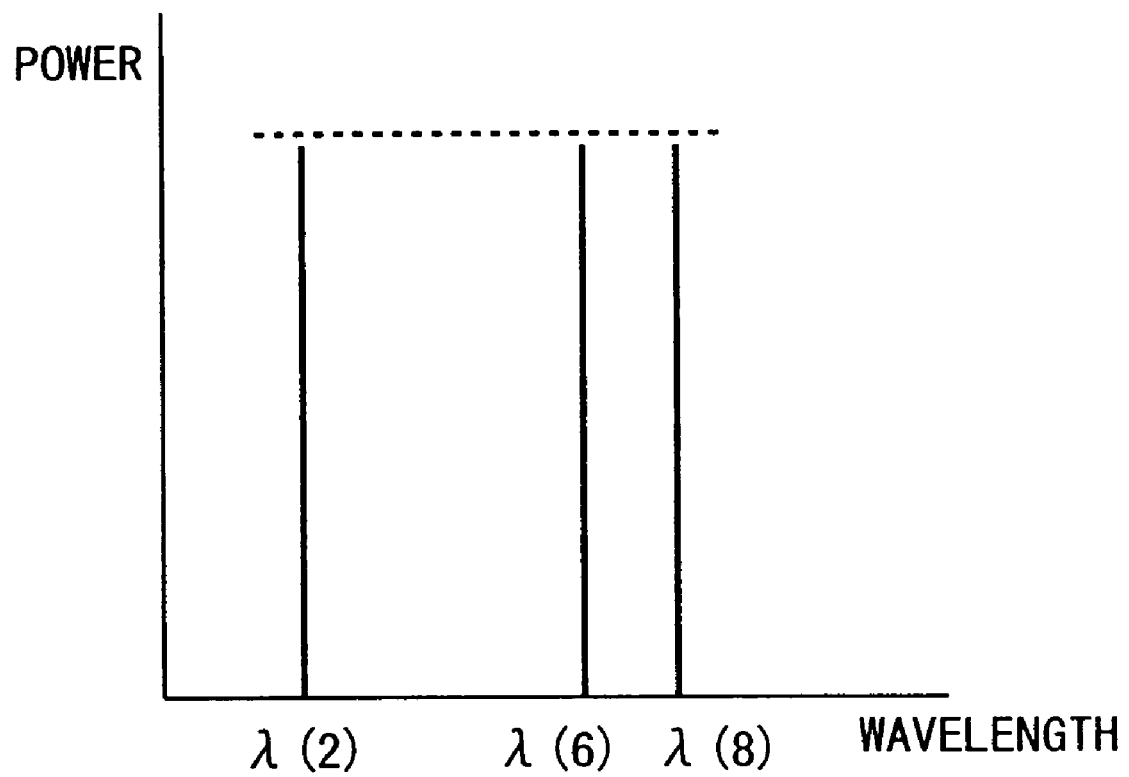
FIG. 21 is a diagram showing an example of a gain tilt correction.

Also, when the transmission property of the evaluation target is the gain tilt, as shown in FIG. 20, there may be a case that the addition of the wavelength ($\lambda(6)$) of the new line leads to deterioration of the gain tilt (a situation where the power of a certain wavelength (here, $\lambda(6)$) protrudes from the other wavelengths). In this case, the transmission property evaluation section 90 and the report/instruction section 91 report the adjustment instruction to the optical transmitter/receiver 10 or output the instruction signal to the predetermined destination so that the gain tilt becomes flat as shown in FIG. 21.

As mentioned above, the transmission property of the optical signal is evaluated in the case where the new line is added. If the transmission property is deteriorated, the correction for the transmission property is carried out so as to eliminate the deterioration. Accordingly, it is possible to control the influence on the existing line in the case where the new line is added.

<Effect of the Embodiment>

According to the embodiments of the present invention, with the first to third transmission route determination methods, it is possible to select the optimal route from the plurality of transmission routes and apply the route to the target line to be added. Thus, the optical signal can be suitably transmitted between the start point and end point of the transmission route.

Also, with the wavelength selection method according to the present invention, the line having excellent transmission property can be set by selecting the optimal wavelength in each section between the start point and end point of the transmission route and applying the wavelength to the line between the start point and the end point. Also, the setting of the line can be executed with flexibility. Also, the optimal route can be selected from the plurality of transmission routes.

Moreover, if the addition of the line has influence on the transmission property of the other lines, the correction for the transmission property can be carried to make the transmission property excellent.

Thus, according to the embodiment of the present invention, it is possible to avoid the problem in the method disclosed in Patent Document 1, for example, the problem in that it is required to bypass the route to acquire the same vacant wavelength. Also, it is possible to eliminate the possibility that the lines under operation may be influenced by switching the wavelength currently being used to a different wavelength in order to avoid the foregoing bypassing.

Moreover, the influence on the other lines caused by the addition of the new line to the optimal route can be suppressed.

<Others>

In the above-mentioned embodiments, the transmission route determination method in the optical signal transmission system including the transmitter, repeater, and receiver, the used wavelength determination method for the line, and the correction method for the transmission property of the optical signal have been explained. However, those methods can be applied to even a case where the repeater does not exist between the transmitter and the receiver. In other words, those methods can be applied between the two transmission devices (between the transmitter and the repeater, between the repeaters, and between the repeater and the receiver) for transmitting and receiving the optical signal.

INDUSTRIAL APPLICABILITY

The present invention can be applied to the optical signal transmission system such as the optical multiplexing transmission system.

What is claimed is:

1. An optical-signal transmission route determination method used in an optical signal transmission system that includes a transmitter for optical signals, a receiver for the optical signals, and one or more repeaters for repeating the optical signals transmitted from the transmitter to the receiver, and has transmission routes for optical signals between the transmitter and the receiver, each transmission route including a plurality of sections, the method serving to determine one of the transmission routes used to set a line for the optical signals between the transmitter and the receiver and comprising:

obtaining, for each section of each transmission route, a number of all wavelengths in-use in that section;

calculating, for each transmission route, a sum of the number of all wavelengths in-use in that transmission route;

comparing the sums calculated, each sum corresponding to a different transmission route; and determining a transmission route, in which the sum is smallest in the comparison among the transmission routes compared.

2. The optical-signal transmission route determination method according to claim 1, further comprising:

setting a line for transmitting an optical signal from the transmitter to the receiver on the determined transmission route; and determining a wavelength of the optical signal to be applied to each section of the determined transmission route.

3. An optical-signal transmission route determination system used in an optical signal transmission system that includes a transmitter for optical signals, a receiver for the optical signals, and one or more repeaters for repeating the optical signals transmitted from the transmitter to the receiver, and has transmission routes for optical signals between the transmitter and the receiver, each transmission route including a plurality of sections, the determination system serving to determine one of the transmission routes used to set a line for the optical signals between the transmitter and the receiver and comprising:

a unit to obtain, for each section of each transmission route, a number of all wavelengths in-use in that section;

a unit to calculate, for each transmission route, a sum of the number of all wavelengths in-use in that transmission route;

a unit to compare the sums calculated, each sum corresponding to a different transmission route; and a unit to determine a transmission route, in which the sum is smallest in the comparison among the transmission routes compared.

4. The transmission route determination system for the optical signals according to claim 3, further comprising:

a unit to set a line for transmitting an optical signal from the transmitter to the receiver on the determined transmission route; and a unit to determine a wavelength of the optical signal to be applied to each section of the determined transmission route.

* * * * *